(12) United States Patent
Courtright

(10) Patent No.: US 9,400,976 B1
(45) Date of Patent: Jul. 26, 2016

(54) SYSTEMS AND METHODS FOR ONE-CLICK FINANCIALS

(71) Applicant: United Services Automobile Association (USAA), San Antonio, TX (US)

(72) Inventor: Christopher P. Courtright, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 13/666,297

(22) Filed: Nov. 1, 2012

Related U.S. Application Data

(63) Continuation of application No. 12/180,793, filed on Jul. 28, 2008, now abandoned.

(51) Int. Cl.
| | | |
|---|---|---|
| *G06F 7/00* | (2006.01) | |
| *G06F 17/30* | (2006.01) | |
| *G06Q 20/10* | (2012.01) | |

(52) U.S. Cl.
CPC .................... *G06Q 20/102* (2013.01)

(58) Field of Classification Search
CPC  G06Q 30/0269; G06Q 20/102; G06Q 10/087
USPC ............. 707/733, 734, 784, E17.06
See application file for complete search history.

(56) References Cited

U.S. PATENT DOCUMENTS

| | | | |
|---|---|---|---|
| 7,346,573 B1 | 3/2008 | Cobrinik et al. | |
| 7,917,415 B1 | 3/2011 | Petruzzi | |
| 8,095,400 B2 * | 1/2012 | Herde et al. | 705/5 |
| 2001/0047280 A1 * | 11/2001 | Alexander et al. | 705/1 |
| 2002/0033416 A1 * | 3/2002 | Gerszberg et al. | 235/380 |
| 2002/0111907 A1 * | 8/2002 | Ling | 705/41 |
| 2003/0066067 A1 * | 4/2003 | Gutta et al. | 725/9 |
| 2003/0212600 A1 | 11/2003 | Hood et al. | |
| 2003/0220872 A1 * | 11/2003 | Chandrashekhar et al. | 705/40 |
| 2005/0076362 A1 * | 4/2005 | Dukes et al. | 725/46 |
| 2005/0144048 A1 | 6/2005 | Belanger et al. | |
| 2005/0240452 A1 | 10/2005 | Breed et al. | |

(Continued)

FOREIGN PATENT DOCUMENTS

EP    1548557 A1    6/2005

OTHER PUBLICATIONS

Department of the Army, "It's Your Move" Army Pamphlet 55-2, Jan. 1, 1994, 27 pgs., [retrieved on May 15, 2008], <http://www.army.mil/usapa/epubs/pdf/p55_2.pdf>.

*Primary Examiner* — MD. I Uddin
(74) *Attorney, Agent, or Firm* — Fletcher Yoder, P.C.

(57) ABSTRACT

A system, method and computer-usable medium are disclosed for managing services provided on behalf of a user through the invocation of a user profile. A service provision management system comprises a user profile registry, which further comprises a plurality of user profiles, each of which is associated with a user. A first user profile is compared to a second user profile within a user interface and recommended modifications to the first user profile are generated in response to user input. The user makes modifications to user information and service provider information contained in the first user profile. Upon invocation of the user profile, service provider instructions, which comprise service execution information, are issued to a service provider to provide a service on behalf of said user.

20 Claims, 20 Drawing Sheets

(56) References Cited

U.S. PATENT DOCUMENTS

| | | | |
|---|---|---|---|
| 2006/0179410 A1* | 8/2006 | Deeds | 715/750 |
| 2008/0004918 A1 | 1/2008 | Orttung et al. | |
| 2008/0005576 A1 | 1/2008 | Weiss | |
| 2008/0317231 A1* | 12/2008 | Balay et al. | 379/201.02 |
| 2009/0030910 A1 | 1/2009 | Bennett et al. | |
| 2010/0036760 A1* | 2/2010 | Abeles et al. | 705/31 |

* cited by examiner

SYSTEMS AND METHODS FOR ONE-CLICK FINANCIALS

CROSS REFERENCE TO RELATED APPLICATIONS

The present application is a Continuation of U.S. patent application Ser. No. 12/180,793, filed on Jul. 28, 2008, and is related in subject matter to the embodiments disclosed in the patent applications below, each of which is hereby incorporated by reference in its entirety:

U.S. patent application Ser. No. 12/180,824, filed on Jul. 28, 2008;

U.S. patent application Ser. No. 12/180,862, filed on Jul. 28, 2008;

U.S. patent application Ser. No. 12/180,895, filed on Jul. 28, 2008.

BACKGROUND

1. Field of the Disclosure

Embodiments of the disclosure relate in general to the field of computers and similar technologies, and in particular to software utilized in this field. Still more particularly, the disclosure provides a system, method, and computer-usable medium for one-click management of services provided on behalf of a user.

2. Description of the Related Art

Military personnel typically need to make a series of financial and personal arrangements in association with military service events like deployment or reassignment. For example, financial arrangements may include initiating automatic payments (e.g., pay mortgage each month), reallocating automatic debits (e.g., increase amount of monthly payments to predetermined credit cards), reducing insurance coverage (e.g., automobile not being driven), and discontinuing utility services (e.g., electrical, water, gas, phone, etc.). Similarly, personal arrangements may include placing an automobile in long-term storage, increasing security services for a vacant residence, and notifying the Post Office of a forwarding address.

The military currently provides personnel with a physical checklist to assist in making these arrangements. However, many of these arrangements require manual efforts on the part of the individual. In some cases, arrangements can be made on-line. However, doing so may require signing on to multiple sites to make arrangements with individual service providers. Furthermore, the checklist is not automated, nor is the information related to making such arrangements consolidated in a single, easily accessible location. As a result, completing the checklist can be tedious and time consuming, and can create the opportunity for omissions and errors on the part of both the individual and the service provider.

BRIEF SUMMARY

A system, method and computer-usable medium are disclosed for managing services provided on behalf of a user through the invocation of a user profile. In various embodiments, a service provision management system is implemented for the management of services provided on behalf of a user. In these and other embodiments, the service provision management system comprises a user profile generator, which is operable to generate user profiles that are in turn associated with a user in a user profile registry. The service provision management system further comprises a repository of user information and service provider information that is cross-referenced to a plurality of user profiles. In addition, the service provision management system comprises a service fulfillment system, which upon invocation of a user profile, is operable to issue service provider instructions to one or more service providers to provide a service on behalf of said user. In various embodiments, these service provider instructions comprise service execution information, which is acted upon by a service provider to provide a service on behalf of a user. In these embodiments, the service provider instructions may be delivered physically, electronically through a network, or by any other means available to the service provider for receiving information related to providing a service on behalf of a user.

In one embodiment, provision of services includes the involvement of a third party to conduct a transaction on behalf of a user. In various embodiments, the third party accesses financial account information associated with a user to conduct the transaction, which may comprise a payment transaction, a funds transfer transaction, an investment account transaction, or an insurance policy transaction. In one embodiment, a user uses one or more computing devices connected to a network to access a plurality of user profiles stored in the user profile registry. In one embodiment, the user manually selects a user profile for invocation by the service provision management system. In various embodiments, the user profile is automatically invoked based upon date or event triggers.

In one embodiment, the service fulfillment system invokes a first user profile for the provision of a first set of services during a first time period and a second user profile for the provision of second set of services during a second time period. In other embodiments, the selection of the second user profile is performed automatically on a predetermined date or in response to a predetermined event and the selected second user profile replaces the first user profile. In yet other embodiments, the selection of the first user profile is performed automatically on a predetermined date or in response to a predetermined event and the selected first user profile replaces the second user profile.

BRIEF DESCRIPTION OF THE DRAWINGS

Selected embodiments of the disclosure may be understood, and its numerous objects and features obtained, when the following detailed description is considered in conjunction with the following drawings, in which.

DETAILED DESCRIPTION

Figure 1:
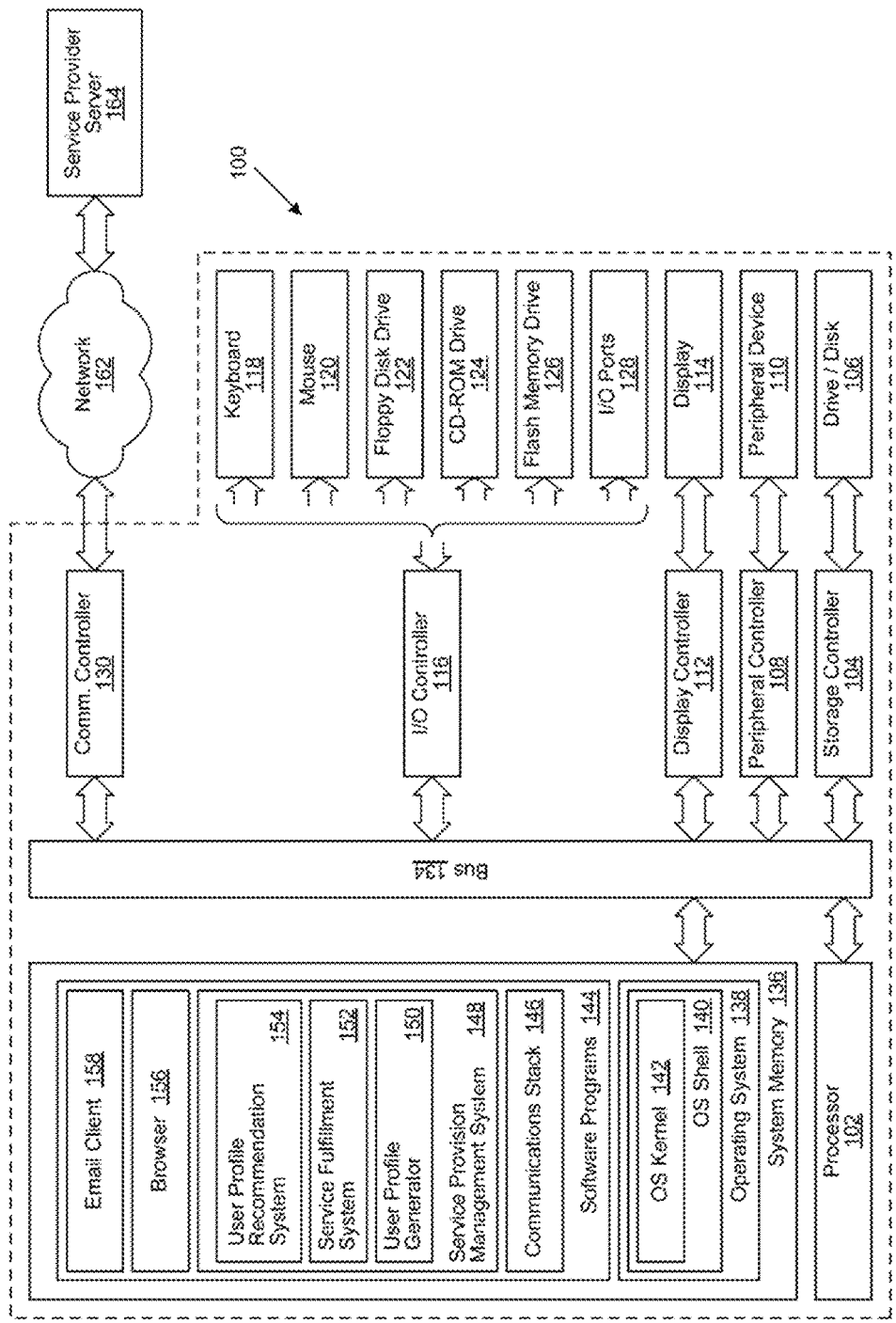
FIG. 1 depicts an exemplary client information processing system (IPS) in which embodiments of the disclosure may be implemented.

A system, method and computer-usable medium are disclosed for managing services provided on behalf of a user through the invocation of a user profile. As will be appreciated by one skilled in the art, the disclosure may be embodied as a method, system, or computer program product. Accordingly, various embodiments may be implemented entirely in hardware, entirely in software (including firmware, resident software, micro-code, etc.) or in an embodiment combining software and hardware. These various embodiments may all generally be referred to herein as a "circuit," "module," or "system."

For purposes of this disclosure, an information processing system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information processing system may be a personal computer, a personal digital assistant (PDA), a wirelessly-enabled mobile telephone, a server, a network storage device, or any other suitable device, and may vary in size, shape, performance, functionality, and price. The information processing system may include random access memory (RAM), one or more processing resources such as a central processing unit (CPU) or hardware or software control logic, read only memory (ROM), and/or other types of nonvolatile memory. Additional components of the information processing system may include one or more disk drives, one or more network ports for communicating with external devices, as well as various input and output (I/O) devices, such as a keyboard, a mouse, and a video display. The information processing system may also include one or more buses operable to transmit communications between the various hardware components.

Additionally, various embodiments may take the form of a computer program product on a computer-usable storage medium having computer-usable program code embodied in the medium. Any suitable computer-usable or computer-readable medium may be utilized. The computer-usable or computer-readable medium may be, for example, but is not limited to, an electronic, magnetic, optical, electromagnetic, infrared, or semiconductor system, apparatus, device, or propagation medium. A non-exhaustive list of more specific examples of the computer-readable medium would include the following: an electrical connection having one or more wires, an optical fiber, a transmission medium such as those supporting the Internet or an intranet, a random access memory (RAM), a read-only memory (ROM), an erasable programmable read-only memory (EPROM or Flash memory), a magnetic storage device, a portable computer diskette, a hard disk, an optical storage device, a portable compact disc read-only memory (CD-ROM), or a digital versatile disk (DVD). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therein, either in baseband or as part of a carrier wave. The computer usable program code may be transmitted using any appropriate medium, including but not limited to the Internet, wireline, optical fiber cable, wireless, radio frequency (RF), etc.

Computer program code for carrying out operations in various embodiments may be written in an object-oriented programming language such as Java, Smalltalk, C++ or the like. However, the computer program code for carrying out operations in various embodiments may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN), a wireless local area network (WLAN), a wireless wide area network (WWAN), or a personal area network (PAN). In addition, the connection may be made to an external computer (for example, through the Internet using an Internet Service Provider) using any combination of telecommunication technologies and protocols operable to establish a network connection for the exchange of information.

Embodiments of the disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer, information processing system, or other programmable data processing apparatus, to function in a particular manner such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process, such that the instructions which execute on the computer or other programmable apparatus provide steps for implementing the functions/acts specified in the flowchart and/or block diagram block or blocks.

FIG. 1 is a generalized block diagram of an exemplary client information processing system (IPS) 100 in which various embodiments may be utilized. Client IPS 100 includes a processor unit 102 that is coupled to one or more buses 134. A display controller 112, which controls a display 114, is also coupled to or more buses 134, along with peripheral controller 108, which controls one or more peripheral devices 110. An input/output (I/O) controller 116 affords communication with various I/O devices, including a keyboard 118, a mouse 120, a floppy disk drive 122, a Compact Disc-Read Only Memory (CD-ROM) drive 124, a flash drive memory 126, and one or more I/O ports 128. The format of the ports connected to the I/O controller 116 may be any known to those skilled in the art of computer architecture, including but not limited to Universal Serial Bus (USB) ports.

Client IPS 100 is able to communicate with a service provider server 164 via a network 162 using a communications controller 130, which is coupled to one or more buses 134. Network 162 may be a public switched telephone network (PSTN), an external network such as the public Internet, an internal network such as an Ethernet-based local area network (LAN), a Virtual Private Network (VPN) such as a corporate intranet, or any combination of telecommunication technologies and protocols operable to establish a network connection for the exchange of information. Using network 162, client IPS 100 is able to access service provider server 164.

A storage controller 104 is also coupled to one or more buses 134. Storage controller 104 interfaces with storage disk or drive 106, which may comprise a magnetic storage device such as a hard disk or tape drive. In various embodiments, storage disk or drive 106 populates a system memory 136, which is also coupled to one or more buses 134. Data that populates system memory 136 includes the client IPS 100 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., an OS kernel 142) for processing. While shell 140 is generally a text-based, line-oriented user interface, various embodiments may also support other user interface modes, such as graphical, voice, gestural, etc. As depicted, OS 138 also includes kernel 142, which includes lower levels of functionality for OS 138, including services used by other parts of OS 138 and software programs 144, including memory management, process and task management, disk management, and mouse and keyboard management.

Software programs 144 may include a communications stack 146, browser 156, and email client 158. The communications stack 146 is operable to implement any communication protocol enabling various embodiments of the disclosure. Browser 156 includes program modules and instructions enabling a World Wide Web (WWW) client (i.e., IPS 100) to send and receive network messages to the Internet using HyperText Transfer Protocol (HTTP) messaging, thus enabling communication with service provider server 164. Software programs 144 also include a service provision management system 148. The service provision management system 148 includes code for implementing the processes illustrated in FIGS. 2-10, described hereinbelow. In one embodiment, client IPS 100 is able to download the service provision management system 148 from the service provider server 164. In various embodiments, the service provision management system 148 also comprises a user profile generator 150, a service fulfillment system 152, and a user profile recommendation system 154.

The hardware elements depicted in client IPS 100 are not intended to be exhaustive, but rather are representative to highlight components used by the disclosure. For instance, client IPS 100 may include alternate memory storage devices such as magnetic cassettes, Digital Versatile Disks (DVDs), Bernoulli cartridges, and the like. These and other variations are intended to be within the spirit and scope of the disclosure.

Figure 2:
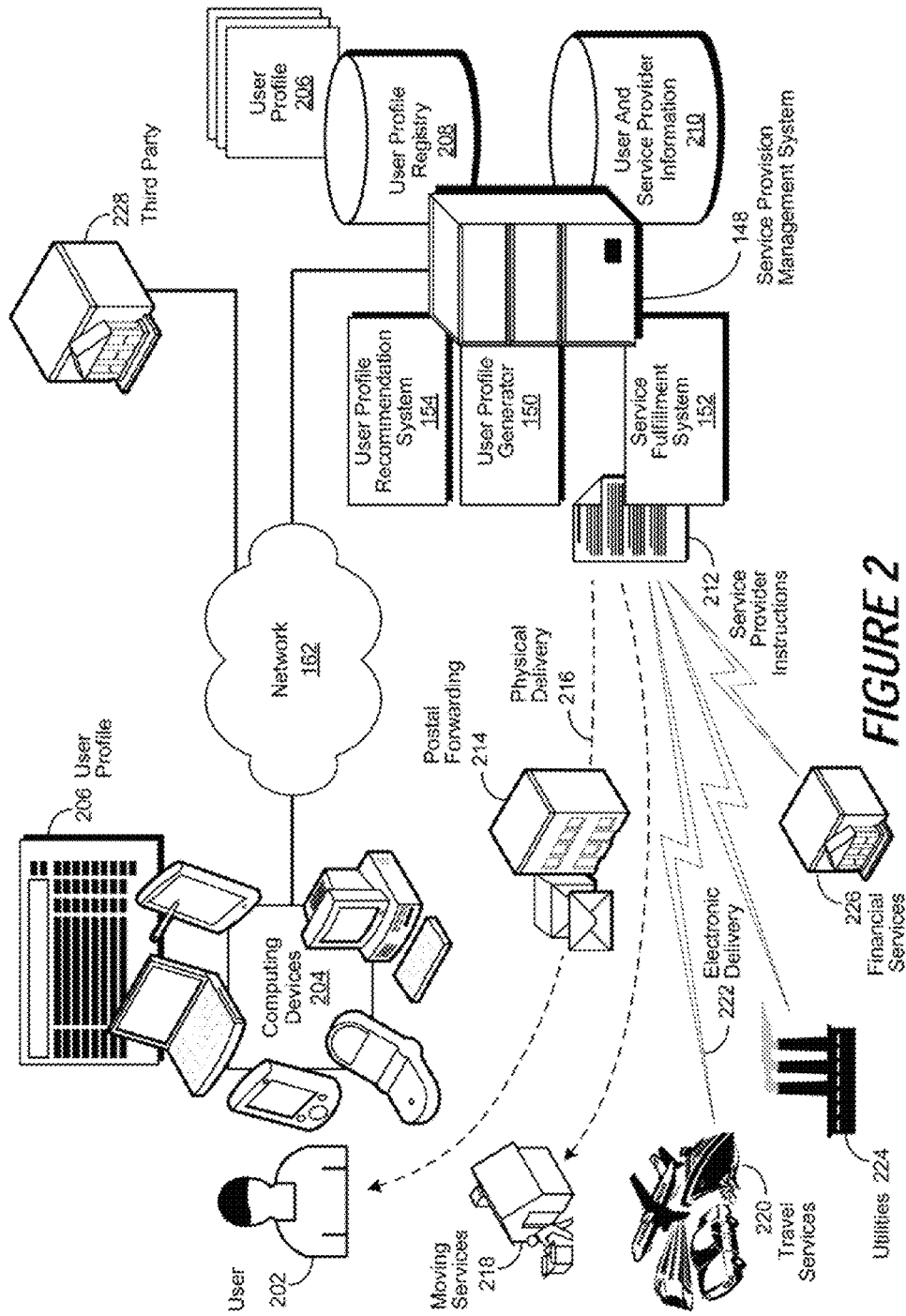
FIG. 2 is a simplified block diagram of a service provision management system as implemented in accordance with an embodiment of the disclosure.

FIG. 2 is a simplified block diagram of a service provision management system as implemented in accordance with an embodiment of the disclosure. In various embodiments, a service provision management system 148 is implemented for the management of services provided on behalf of a user 202. In these and other embodiments, the service provision management system 148 comprises a user profile registry 208, which further comprises a plurality of user profiles 206, each of which is associated with a user 202. The service provision management system 148 further comprises a repository of user information and service provider information 210 operable to be cross-referenced to the plurality of user profiles 206. In addition, the service provision management system 148 comprises a user profile generator 150, and a service fulfillment system 152, which upon invocation of a user profile 206, is operable to issue service provider instructions 212 to one or more service providers to provide a service on behalf of said user 202. In various embodiments, these service provider instructions 212 comprise service execution information, which is acted upon by a service provider to provide a service on behalf of the user 202. In various embodiments, a service provided on behalf of the user 202 may comprise postal forwarding services 214, moving services 218, travel services 220, services provided by utilities 224, or financial services 226. In these embodiments, the service provider instructions 212 may be delivered physically 216, electronically 222 through network 162, or by any other means operable for the service provider to receive information related to providing a service on behalf of the user 202. In one embodiment, provision of services (e.g., 214, 218, 220, 224, and 226) includes the involvement of a third party 228 to conduct a transaction on behalf of the user 202. In various embodiments, the third party accesses financial account information associated with the user 202 to conduct the transaction, which may comprise a payment transaction, a funds transfer transaction, an investment account transaction, or an insurance policy transaction.

In one embodiment, user 202 uses one or more computing devices 204 connected to network 162 to access a plurality of user profiles 206 stored in the user profile registry 208. In one embodiment, the user 202 manually selects a user profile 206 for invocation by the service provision management system 148. In various embodiments, the user profile 206 is automatically invoked based upon date or event triggers as described in greater detail herein.

In one embodiment, the service provision management system comprises a user profile recommendation system 154, which is operable to generate recommended modifications to a user profile 206 in response to user input. In another embodiment, a recommended user profile is generated from user, service provider, and other information. In yet another embodiment, a user profile associated with a peer group of users is provided for comparison and recommendations. Based upon a comparison of the displayed user profiles 206, the user 202 makes modifications to user information and service provider information contained in the first user profiles 206. In one embodiment, the modifications are made in response to the user 202 interacting with a plurality of graphical elements within a graphical user interface (GUI). In one embodiment the modifications are saved under the original name of the first user profile. In another embodiment, the modifications are saved under a new name as a new user profile.

Figure 3A:
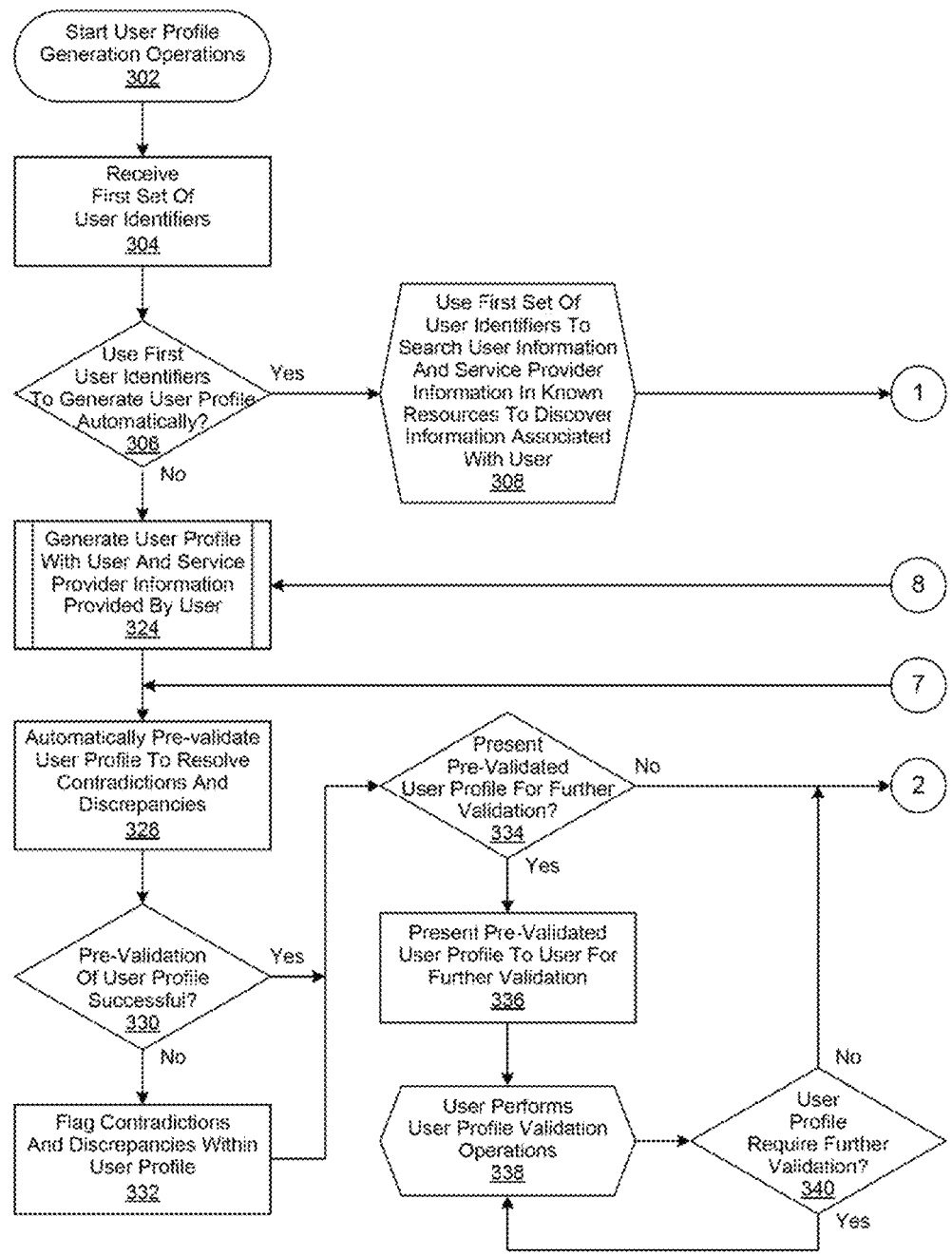
FIGS. 3a-c are a generalized flowchart of the generation of a user profile by a user profile generator implemented in accordance with an embodiment of the disclosure.
Figure 3B:
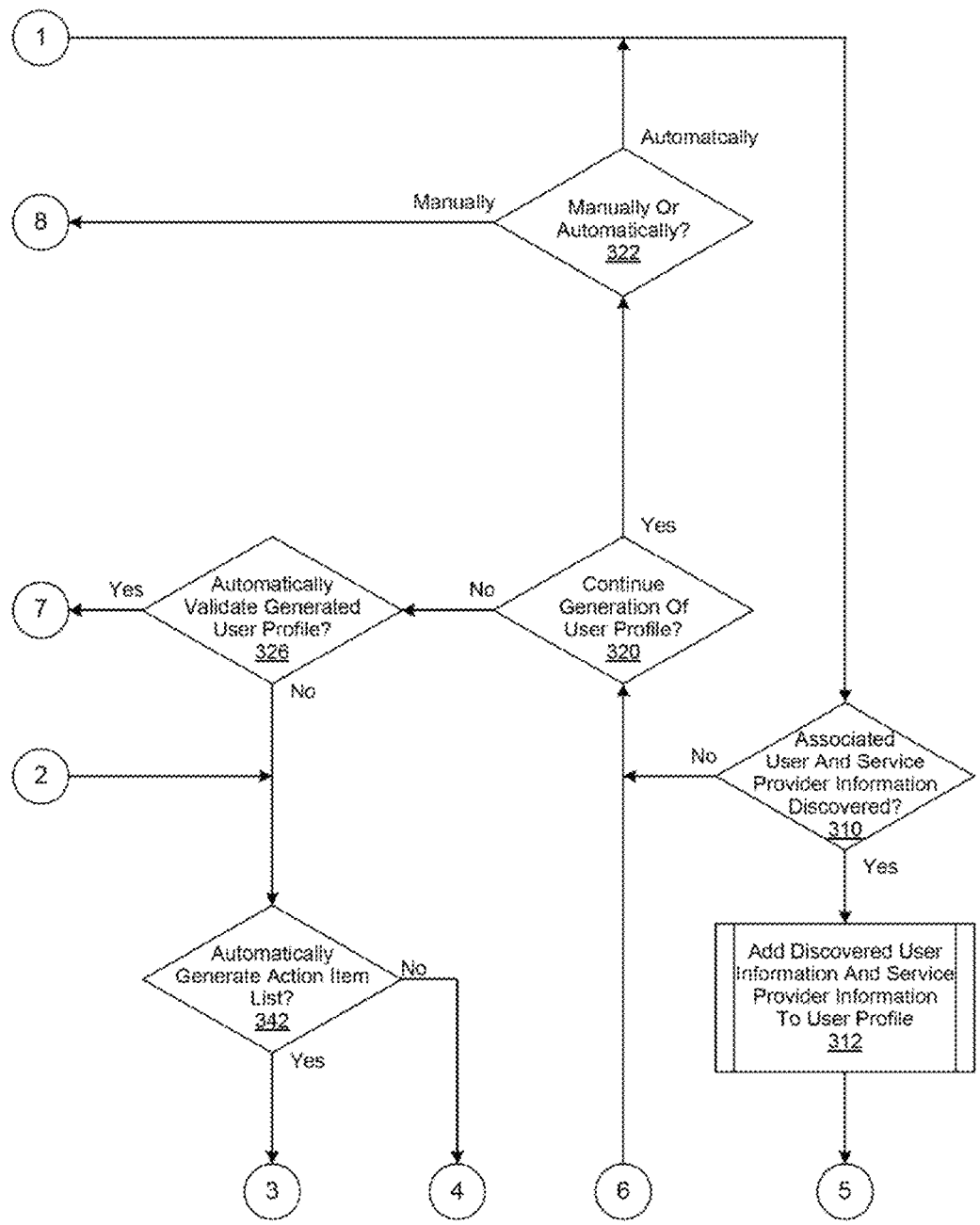
Figure 3C:
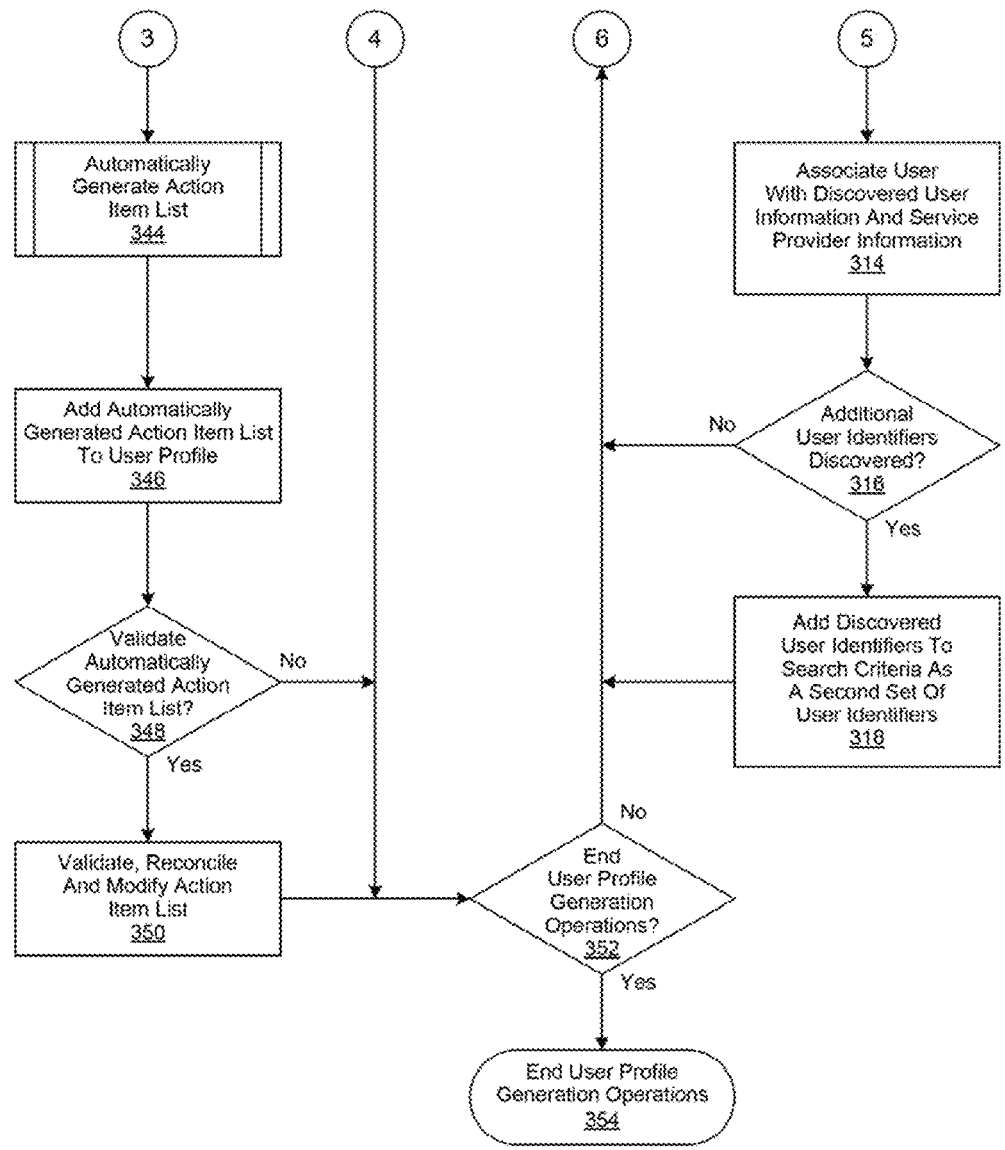
Figure 4A:
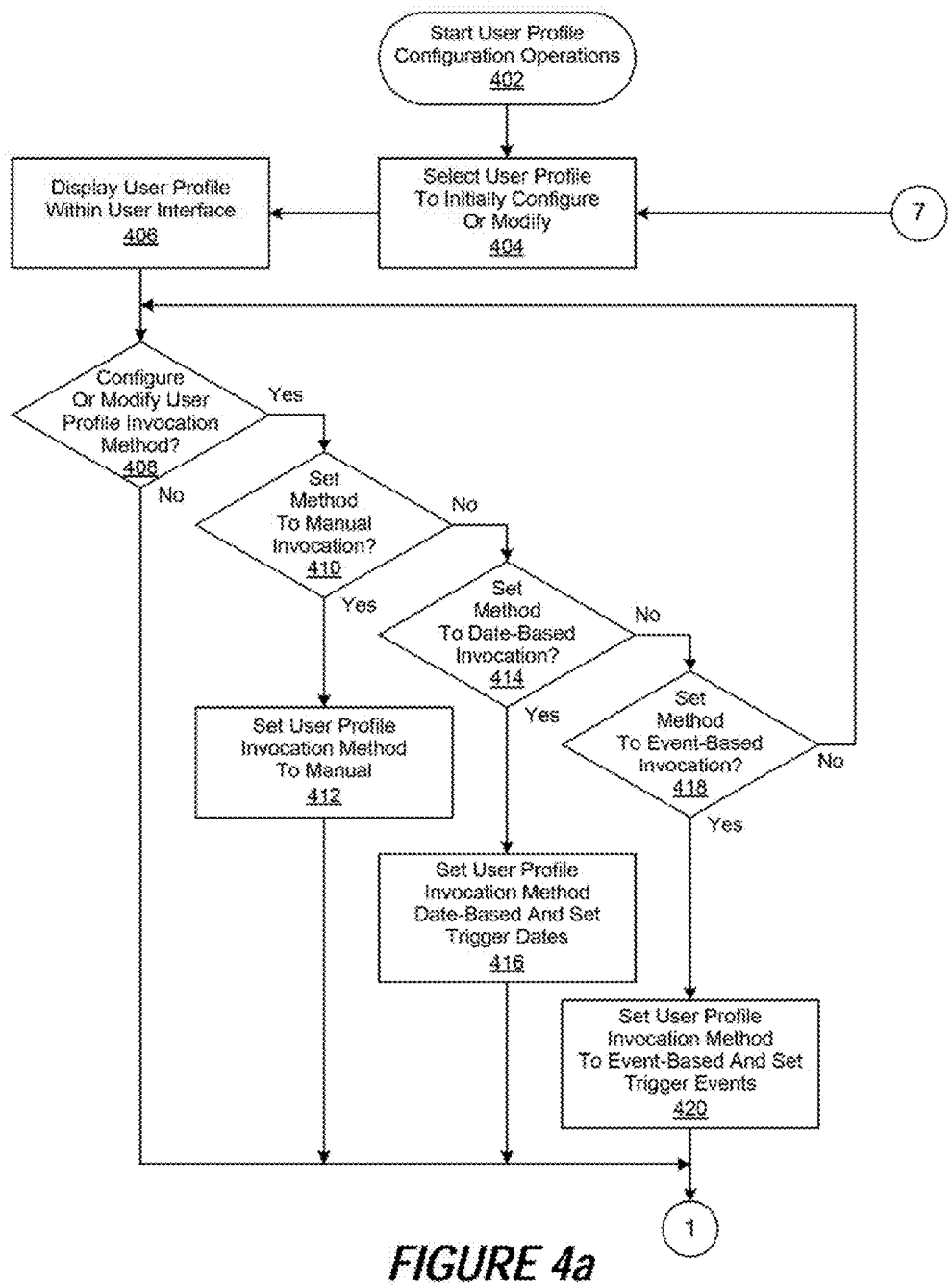
FIGS. 4a-f are a generalized flowchart of the configuring of a user profile as implemented in accordance with an embodiment of the disclosure.
Figure 4B:
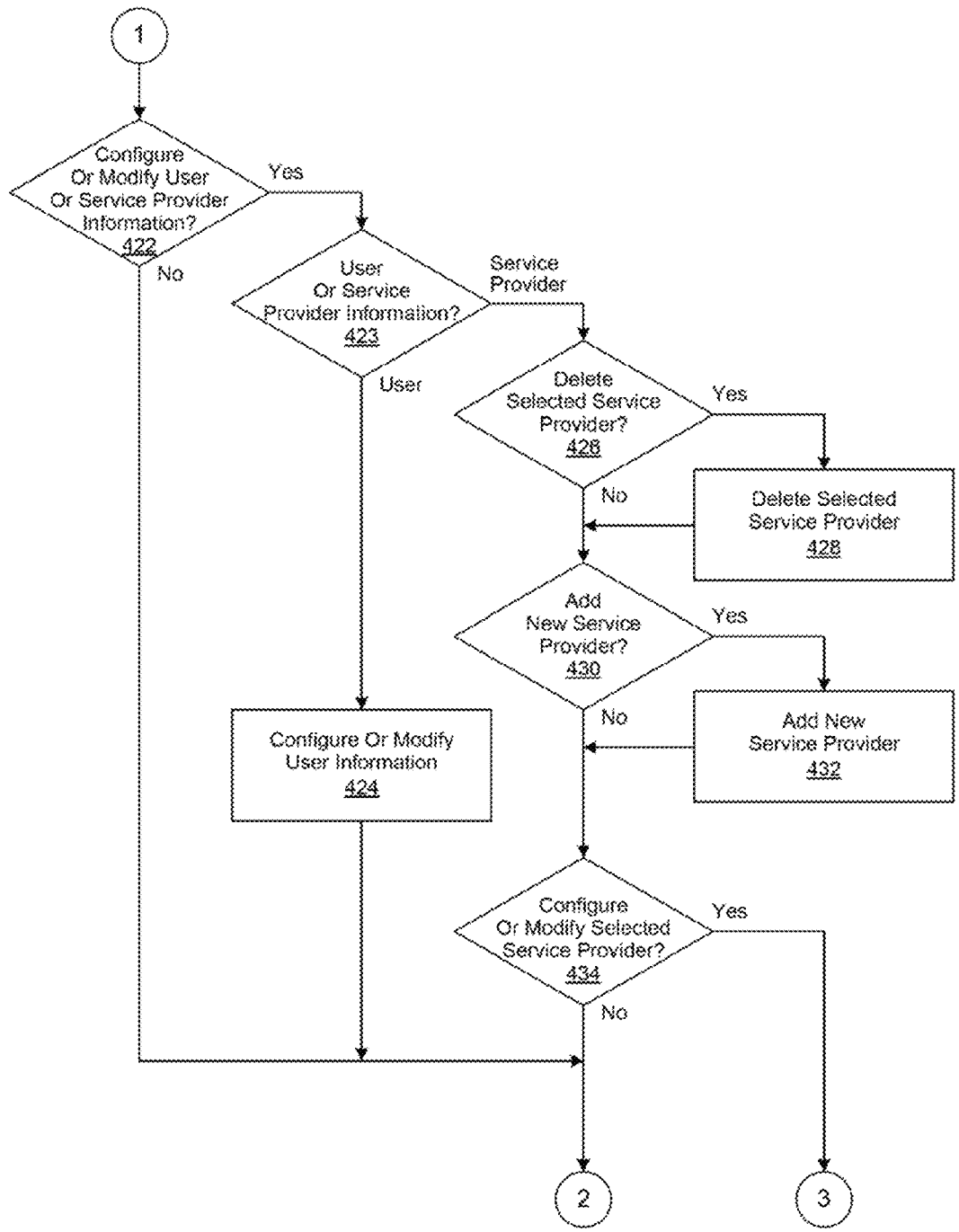
Figure 4C:
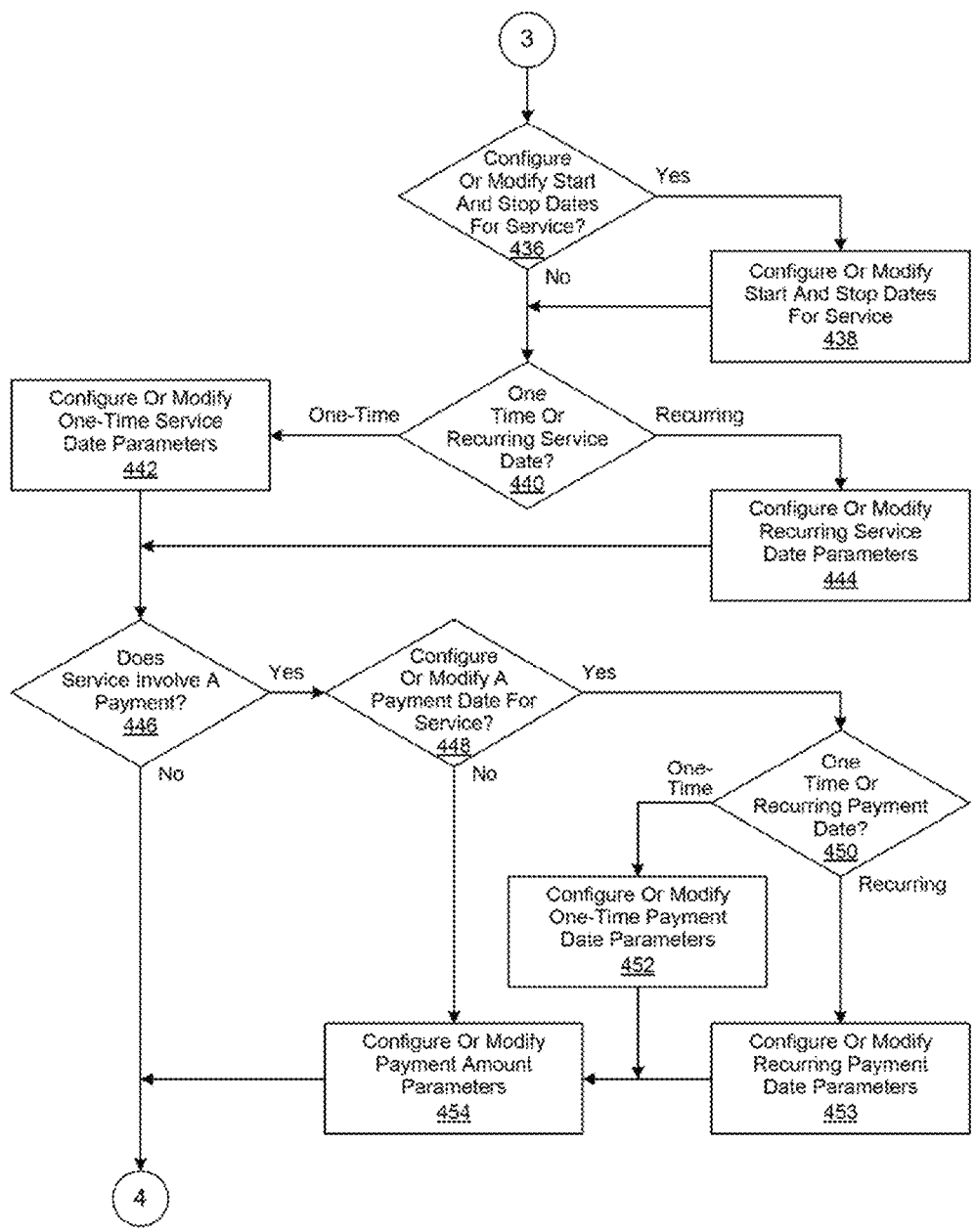
Figure 4D:
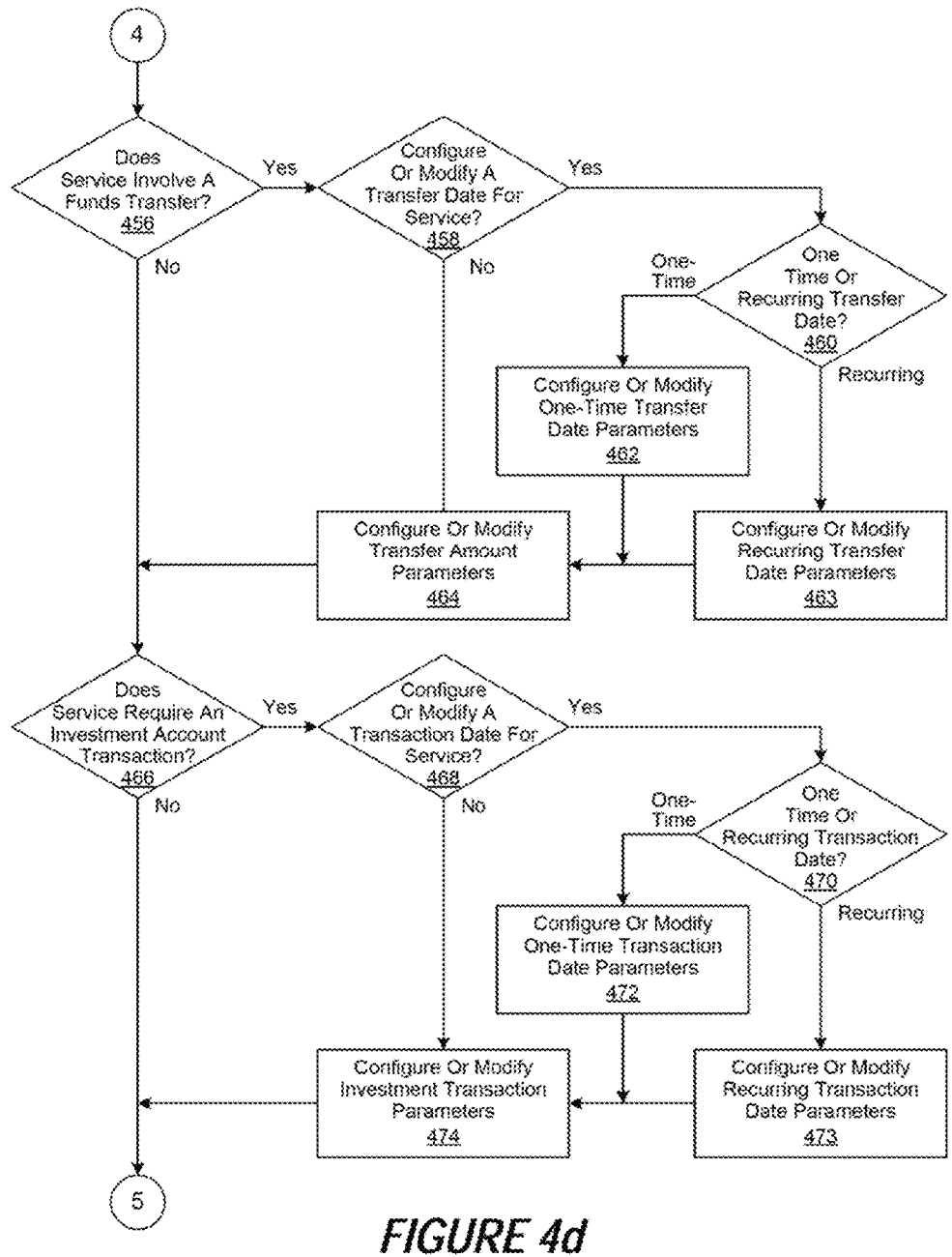
Figure 4E:
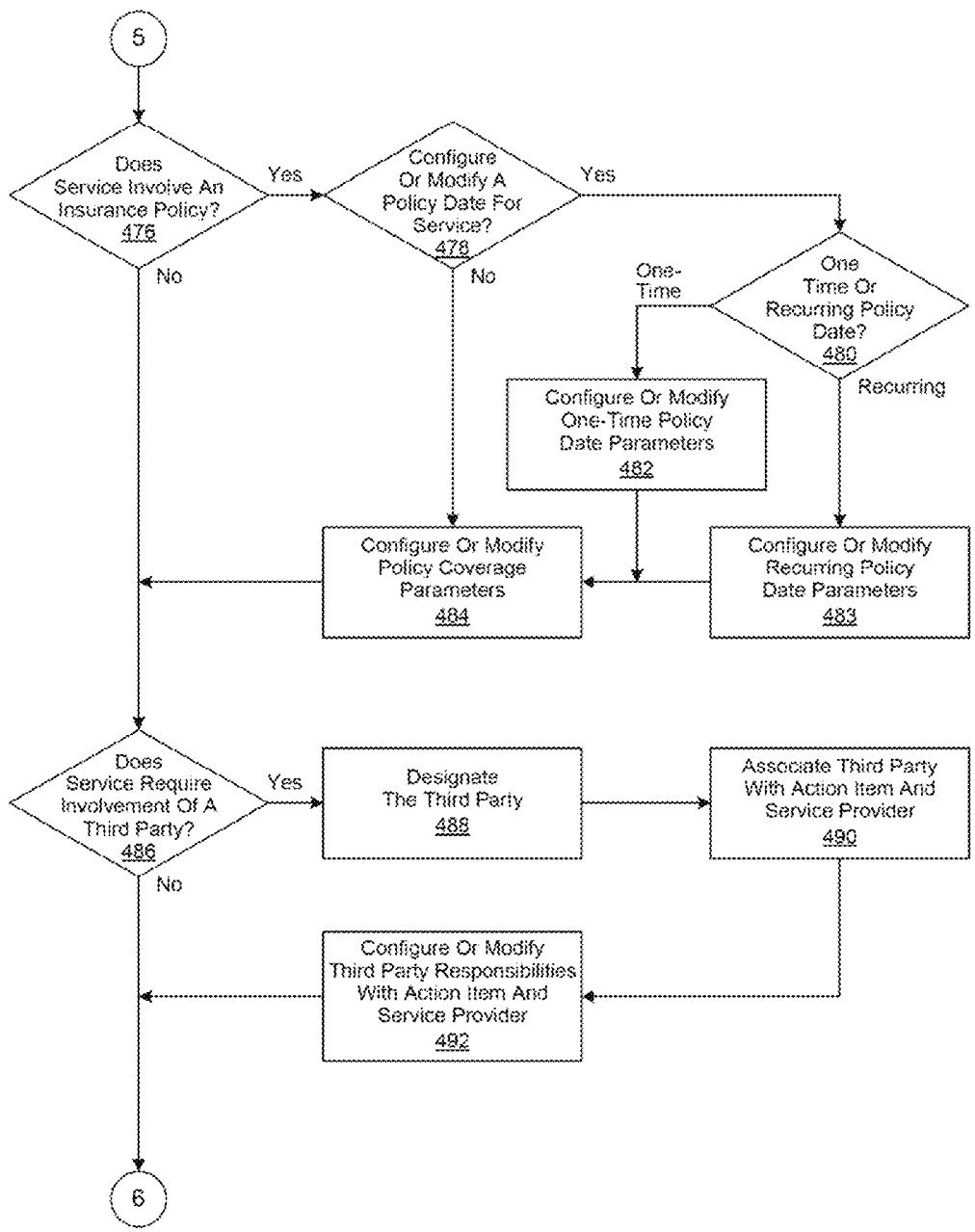
Figure 4F:
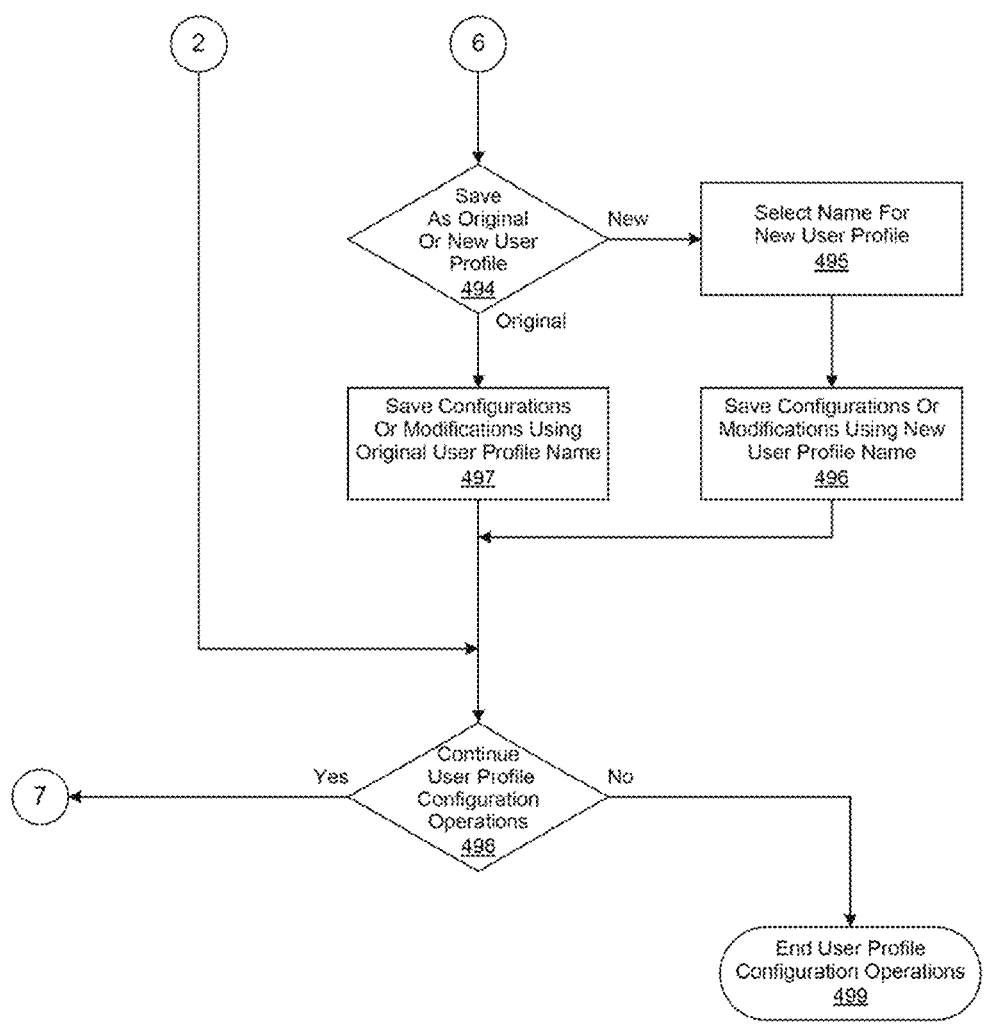

FIGS. 3*a-c* are a generalized flowchart of the generation of a user profile by a user profile generator as implemented in accordance with an embodiment of the disclosure. In this embodiment, user profile generation operations are begun in block 302, followed by the receipt of a first set of user identifiers, such as a user's name, address, telephone number, or Social Security Number, in block 304. As used herein, a user profile is defined as a plurality of cross-referenced user information and service provider information used for the provision of a service, directly or indirectly, by a service provider on behalf of the user. In various embodiments, a user profile comprises an action item list, further comprising action items associated with a service to be provided on behalf of the user by one or more service providers. It will be appreciated that in various embodiments, such user information may include the user's name, one or more addresses, one or more telephone numbers, other contact information, and service preferences. Likewise, service provider information may include the service provider's name, one or more service provider addresses, one or more service provider telephone numbers, and other contact and customer service information such as the names of one or more service representatives. The service provider information may also include the user's account number, information related to the service provided by the service provider, as well as payment dates, frequencies, and amounts. In various embodiments, a user profile is generated by a user profile generator, and once generated, is stored in a user profile registry. In these various embodiments, the user profiles are indexed to the aforementioned cross-referenced user information and service provider information, which is stored in a user and service provider information repository.

A determination is made in block 306 whether the first set of user identifiers is to be used to automatically generate a user profile. If so, then the first set of user identifiers is used as search criteria in block 308 to search user information and service provider information in known resources to collect user and service provider information associated with the user. A determination is then made in block 310 whether user information and service provider information has been discovered. If not, then a determination is made in block 320 whether to continue generation of the profile. If so, then a determination is made in block 322 whether the user profile will continue to be generated manually or automatically. If it is determined in block 322 to continue generation of the user profile automatically, then the process continues, proceeding with block 310. Alternatively, if it is determined at 310 that associated user and service provider information has been discovered, then the discovered user information and service provider information is added to the user profile in block 312, followed by the forming of an association between the user and the discovered user information and service provider information in block 314. A determination is then made in block 316 whether additional user identifiers were discovered during the search. If so, the additional discovered user identifiers are added as a second set of user identifiers to the search criteria in block 318. As an example, the name and Social Security Number (SSN) of a user may be provided as the first set of user identifiers. The name and SSN can then be used to acquire a credit report that provides a financial account number associated with the user. The financial account, which may be used for on-line bill payments, has account numbers for service providers providing services to the user. However, if no additional user identifiers were discovered in block 316, or if the discovered user identifiers were added as search criteria in block 318, then a determination is made in block 320 whether to continue generation of the profile. If so, then a determination is made in block 322 whether the user profile will continue to be generated manually or automatically. If it is determined in block 322 to continue generation of the user profile automatically, then the process continues, proceeding with block 310. Otherwise, or if it was determined in block 306 to generate the user profile manually, then generation of the user profile continues in block 324 using user information and service provider information provided by the user.

The generated user profile is then automatically pre-validated in block 328 to resolve contradictions and discrepancies. As an example, the user profile may list five different service providers who list the user's address as "123 Abrams Street," while a sixth service provider lists the user's address as "128 Abrams Street." Since five service providers accounts have the same user address and one does not, in addition to the similarity between the number "3" and the number "8", it can be assumed that the address provided by the sixth service provider is incorrect. As a result, the incorrect entry in the user profile can be reconciled and corrected. A determination is then made in block 330 whether the pre-validation of the user profile was successful. If not, then contradictions and discrepancies within the user profile are flagged for subsequent review by the user in block 332. Otherwise, a determination is made in block 334 whether the pre-validated user profile is to be presented to the user for review and further validation in block 336. If so, then the pre-validated user profile is presented to the user for review and further validation in block 336. The user then performs review and further user profile validation operations in block 338. A determination is then made in block 340 whether the user profile requires further validation. If so, the process continues, returning to block 338. Otherwise, or if it is determined in block 334 not to present the pre-validated user profile to the user for review and further validation, then a determination is made in block 342 whether to automatically generate an action item list for the user profile. If so, then an action item list is generated in block 344. As used herein, an action item list is defined as a list of services to be provided by one or more service providers. Once generated, the action item list is added to the user profile in block 346. A determination is then made in block 348 whether to validate the automatically generated action item list. If so, then the automatically generated action item list is validated and reconciled by the user in block 350, and if the user desires, modified. Otherwise, or if it is determined in block 342 not to automatically generate an action item list, then a determination is made in block 352 whether to end user profile generation operations. If not, then a determination is made in block 320 whether to continue generation of the user profile. If so, the process continues, proceeding with block 322. Otherwise, a determination is made in block 326 whether to automatically validate the generated user profile. If so, the process continues, proceeding with block 328. Otherwise, the process continues, proceeding with block 342. However, if it is determined in block 352 to end user profile generation operations, they are ended in block 354.

FIGS. 4*a-f* are a generalized flowchart of the configuring of a user profile as implemented in accordance with an embodiment of the disclosure. In this embodiment, user profile configuration operations are begun in block 402. As used herein, user profile configuration operations include the configuration of a newly configured user profile as well as modifications to a previously configured user profile. Accordingly, a user profile that is to be configured or modified is selected in block 404 and then displayed within a user interface in block 406. A determination is then made in block 408 whether to configure or modify the user profile invocation method. As used herein, the invocation method of a user profile refers to the process by which a user profile is invoked. As described in greater detail herein, invocation of a user profile results in the execution of instructions to one or more service providers to provide one or more services on behalf of a user.

If it is determined in block 408 to configure or modify the user profile invocation method, then a determination is made in block 410 whether the user profile invocation method is to be set to manual invocation. If so, then the user profile invocation method is set to manual invocation by a user or administrator in block 412. Otherwise, a determination is made in block 414 whether the user profile invocation method is to be set to date-based invocation. If so, then the user profile invocation method is set to date-based invocation and the trigger dates for invocation are set in block 416. As an example, the user profile may be invoked on the day prior to the scheduled return of a military personnel from deployment. Otherwise, a determination is made in block 418 whether the user profile invocation method is to be set to event-based invocation. If so, the user profile invocation method is set to event-based and the event triggers are set in block 420. As an example, the user profile may be invoked by a change in the value of an investment, which results in a reallocation of funds. Otherwise, the process is repeated, proceeding with block 408.

However, if it is determined in block 408 not to configure or modify a user profile invocation method, or once the user invocation method has been set in blocks 412, 416, or 420, then a determination is made in block 422 whether to configure or modify user or service provider information contained in the user profile. If it is determined in block 422 to not configure or modify the user or service provider information, then a determination is made in block 498 whether to continue user profile configuration operations. If so, the process continues, proceeding with block 404. Otherwise user profile configuration operations are ended in block 499. However, if it is determined in block 422 to configure or modify the user or service provider information, then a determination is made in block 423 whether user or service provider information is to be configured or modified. If it is determined in block 423 to configure or modify user information contained in the user profile, then the user information is configured or modified in block 424. However, if it is determined in block 423 to configure or modify service provider information contained in the user profile, then a determination is made in block 426 whether to delete a selected service provider. If so, the selected service provider is deleted from the user profile in block 428.

If the selected service provider should not be deleted, or once the selected service provider is deleted in block 428, a determination is made in block 430 whether to add a new service provider. If so, the new service provider is added in block 432. Otherwise, or once the new service provider is added in block 428, a determination is made in block 434 whether to configure or modify a selected service provider's information. If not, or once user information is configured or modified in block 424, a determination is made in block 498 whether to continue user profile configuration operations. If so, the process continues, proceeding with block 404. Otherwise user profile configuration operations are ended in block 499.

However, if it is determined in block 434 to configure or modify a selected service provider's information, then a determination is made in block 436 whether the start and stop dates for a provided service are to be configured or modified. If so, then they are configured or modified in block 438. Otherwise, a determination is made in block 440 whether the service start and stop dates are set for a one-time service date or for recurring service dates. If one-time, then one-time service date parameters are configured or modified in block 442. If recurring, then recurring service date parameters are configured or modified in block 444.

Once the one-time or recurring service dates are respectively configured or modified in blocks 442 or 444, a determination is made in block 446 whether the service involves a payment. If so, then a determination is made in block 448 whether to configure or modify a payment date for the service. If so, then a determination is made in block 450 whether the payment date is a one-time payment date or a recurring payment date. If the payment date is a one-time payment date, then one-time payment date parameters are configured or modified in block 452. Alternatively, if the payment date is recurring, then recurring payment date parameters are configured or modified in block 453. Once one-time or recurring payment date parameters have been respectively configured or modified in blocks 452 or 453, or if it is determined in block 448 not to configure or modify a payment date, then payment amount parameters are configured or modified in block 454.

Once payment amount parameters have been configured or modified in block 454, or if it is determined in block 446 that the service does not involve a payment, then a determination is made in block 456 whether the service involves a funds transfer. As an example, a service may be provided that transfers a portion of funds that are automatically deposited into a user's checking account into the checking account of a child that is in college. If so, then a determination is made in block 458 whether to configure or modify a transfer date for the service. If so, then a determination is made in block 460 whether the transfer date is a one-time transfer date or a recurring transfer date. If the transfer date is a one-time transfer date, then one-time transfer date parameters are configured or modified in block 462. Alternatively, if the transfer date is recurring, then recurring transfer date parameters are configured or modified in block 463. Once one-time or recurring transfer date parameters have been respectively configured or modified in blocks 462 or 463, or if it is determined in block 458 not to configure or modify a transfer date, then transfer amount parameters are configured or modified in block 464.

Once transfer amount parameters have been configured or modified in block 464, or if it is determined in block 456 that the service does not involve a transfer, then a determination is made in block 466 whether the service involves an investment account transaction. As an example a service may be provided that transfers a portion of funds that are automatically deposited into a user's checking account into an investment account. If so, then a determination is made in block 468 whether to configure or modify a transaction date for the service. If so, then a determination is made in block 470 whether the transaction date is a one-time transaction date or a recurring transaction date. If the transaction date is a one-time payment date, then one-time transaction date parameters are configured or modified in block 452. Alternatively, if the transaction date is recurring, then recurring transaction date parameters are configured or modified in block 473. Once one-time or recurring transaction date parameters have been respectively configured or modified in blocks 472 or 473, or if it is determined in block 468 not to configure or modify a transaction date, then transaction amount parameters are configured or modified in block 474.

Once transaction amount parameters have been configured or modified in block 474, or if it is determined in block 466 that the service does not involve an investment transaction, then a determination is made in block 476 whether the service involves an insurance policy. As an example, a service may be provided that reduces automobile insurance coverage the day after the scheduled deployment date of a military personnel. If so, then a determination is made in block 478 whether to configure or modify an insurance policy date as the service. If so, then a determination is made in block 480 whether the insurance policy date is a one-time insurance policy date or a recurring insurance policy date. If the insurance policy date is a one-time policy date, then one-time policy date parameters are configured or modified in block 482. Alternatively, if the policy date is recurring, then recurring insurance policy date parameters are respectively configured or modified in block 483. Once one-time or recurring insurance policy date parameters have been configured or modified in blocks 482 or 483, or if it is determined in block 478 not to configure or modify an insurance policy date transaction date, then insurance policy coverage parameters are configured or modified in block 484.

Once insurance policy coverage parameters have been configured or modified in block 484, or if it is determined in block 476 that the service does not involve an insurance policy, then a determination is made in block 486 whether the service involves a third policy. As an example, a service may be provided that involves a third party broker to make a change in the investment portfolio of a user. As a result, the broker may submit funds transfer instructions to a financial institution on behalf of a user, and then use the transferred funds to purchase an investment that is then placed in an investment account of the user. If it is determined in block 486 that the service requires the involvement of a third party, then the third party is designated in block 488. The designated third party is then associated with an action item from the action item list of the user profile and a service provider who is designated to provide the service associated with the action item. The responsibilities of the third party, as they relate to the service provider and the action item, are then configured or modified in block 492. Thereafter, or if the service does not require involvement of a third party, a determination is made in block 494 whether to save the configured or modified user profile under its original name or as a new user profile with a new name. If new, then a new name for the new user profile is selected in block 495 and the new user profile is saved under the new name in block 496. If original, then the configurations or modifications to the user profile are saved under the original name in block 497. A determination is then made in block 498 whether to continue user profile configuration operations. If so, then the process continues, proceeding with block 404. Otherwise, user profile configuration operations are ended in block 499.

Figure 5A:
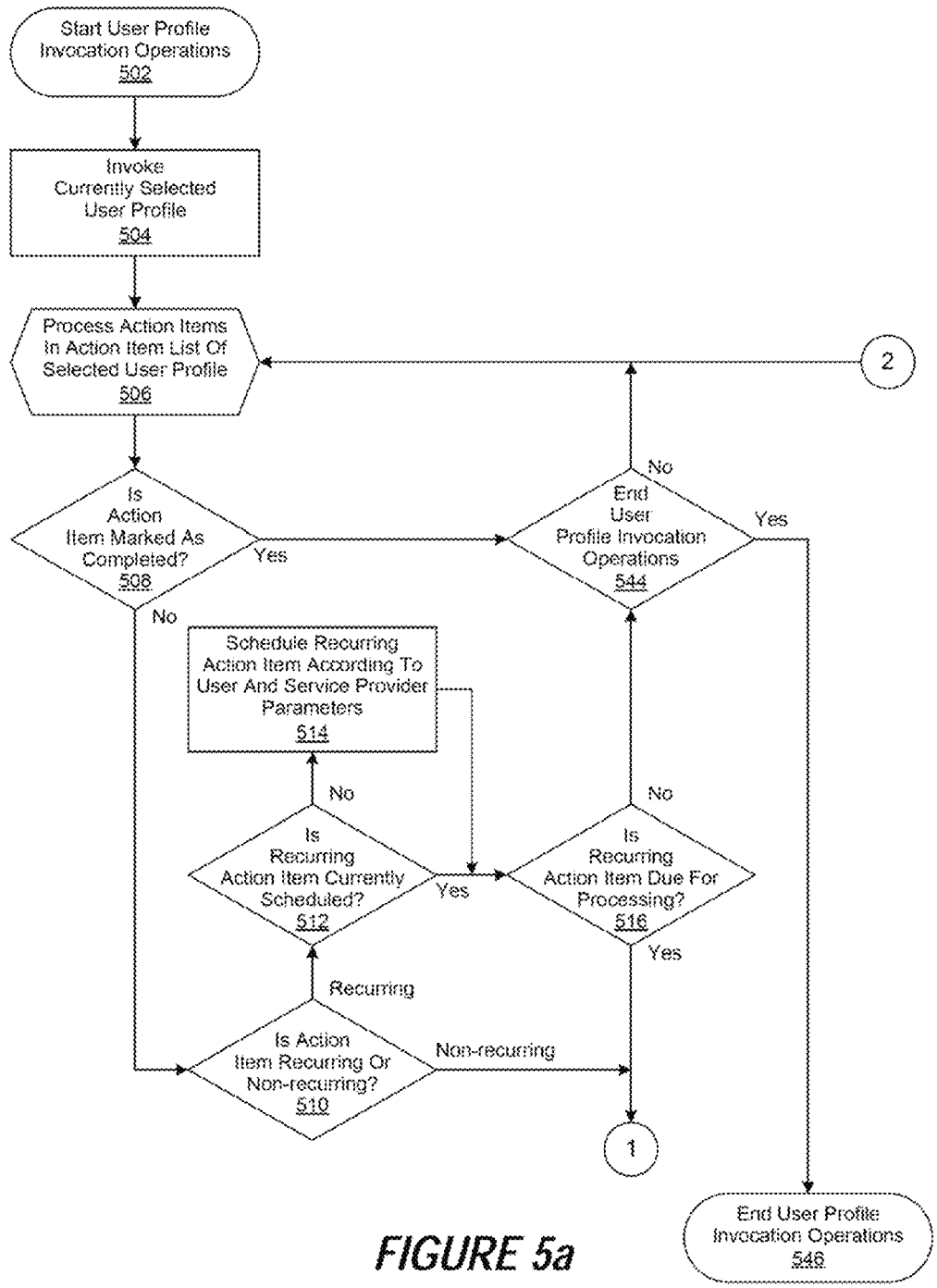
FIGS. 5a-b are a generalized flowchart of the invocation of a user profile as implemented in accordance with an embodiment of the disclosure.
Figure 5B:
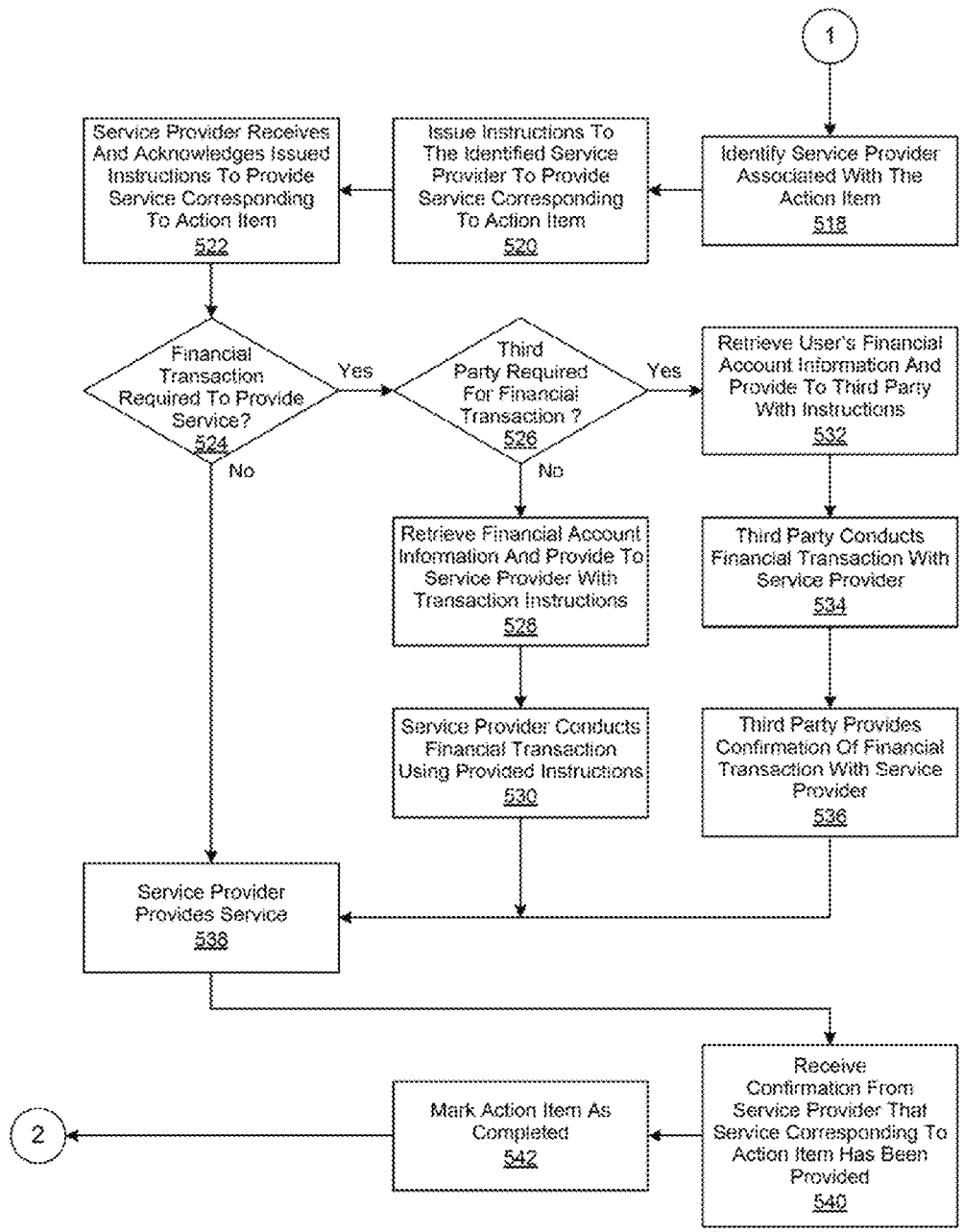

FIGS. 5a-b are a generalized flowchart of the invocation of a user profile as implemented in accordance with an embodiment of the disclosure. In this embodiment, user profile invocation operations are begun in block 502, followed by the invocation of the currently selected user profile in block 504. Processing of action items contained in the action item list of the currently selected user profile is then begun in block 506. A determination is then made in block 508 whether an action item is marked as completed. If so, then a determination is made in block 544 whether to end user profile invocation operations. If so, then user profile invocation operations are ended in block 546. Otherwise, the process continues, returning to block 506. However, if it is determined in block 508 that the action item is not marked as completed, then a determination is made in block 510 whether the action item is a recurring or non-recurring action item. If recurring, then a determination is made in block 512 whether the recurring action item is currently scheduled. If not, then the recurring action item is scheduled according to user and service provider parameters in block 514. Once the recurring action item is scheduled in block 514, or if it is determined in block 512 that the recurring action item is already scheduled, then a determination is made in block 516 whether the recurring action item is due for processing. If not, then a determination is made in block 544 whether to end user profile invocation operations.

However, if it is determined in block 510 that the action item is non-recurring, or if it is determined in block 516 that the recurring action item is due for processing, then the service provider associated with the action item is identified in block 518. Instructions are then issued to the identified service provider to provide the service associated with the action item in block 520. In block 522, the identified service provider receives and acknowledges the instructions issued to provide the service associated with the action item. A determination is then made in block 524 whether a financial transaction is required to provide the service. If so, then a determination is made in block 526 whether a third party's involvement is required to provide the service. If not, then in 528 financial account information associated with the user is retrieved and provided to the service provider along with instructions related to the transaction.

The service provider then uses the provided instructions to conduct the financial transaction in block 530. However, if it is determined in block 526 that a third party is required for the financial transaction, then financial account information associated with the user is retrieved in block 532 and provided to the third party with instructions relating to the third party's involvement in the provision of the service. The third party then conducts the financial transaction with the service provider in block 534. Once the financial transaction is conducted in block 534, the third party provides confirmation of the financial transaction with the service provider in block 536. Once the financial transaction has been conducted in block 530, or confirmation is received from the third party in block 536, or if it is determined in block 524 that no financial transaction is required for the service, then the service provider provides the service in block 538. Confirmation is then received from the service provider in block 540 that the service corresponding to the action item has been provided and the action item is marked on the action item list as completed in block 542. The process then continues, proceeding with block 506.

Figure 6:
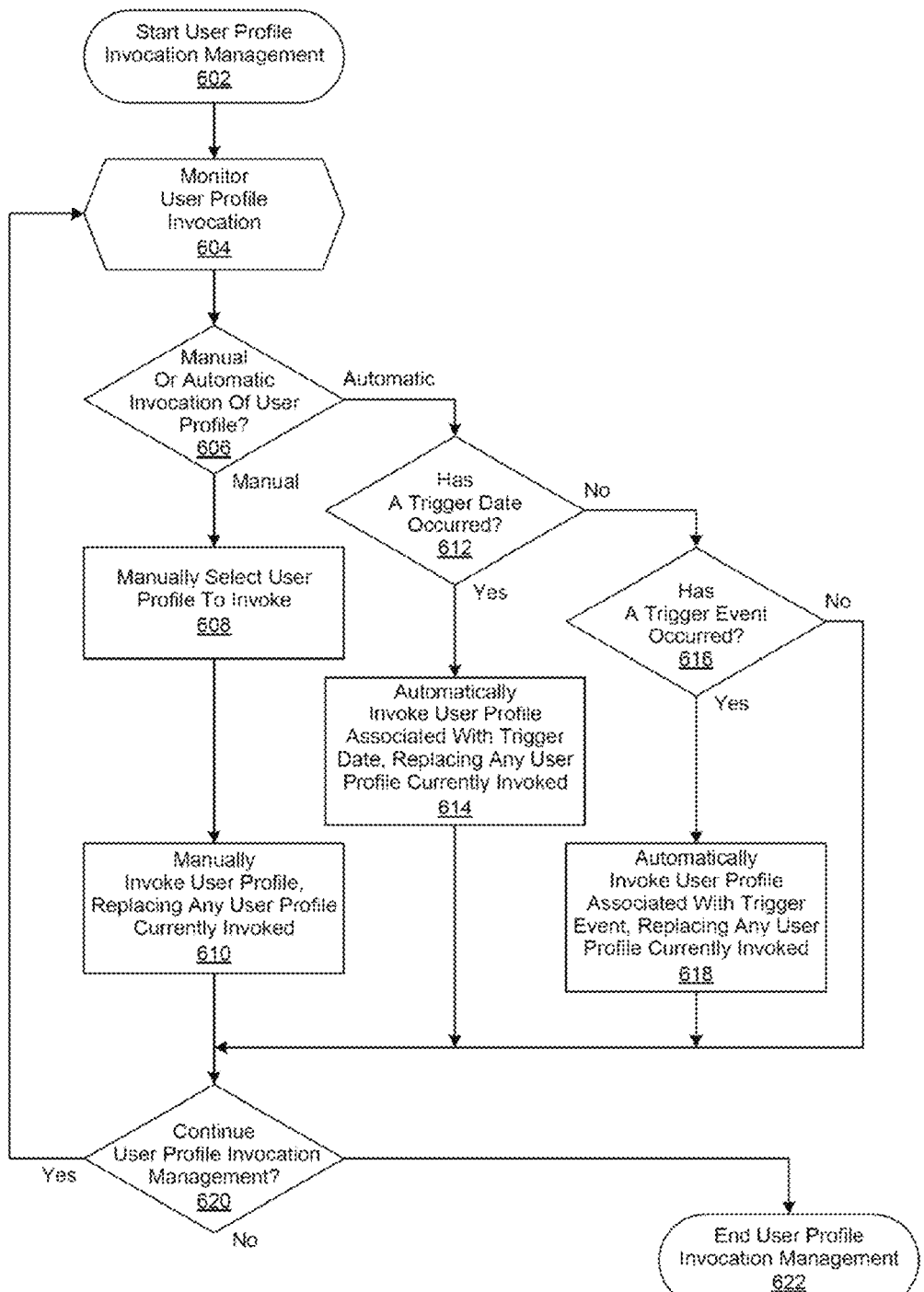
FIG. 6 is a generalized flowchart of managing the invocation of a plurality of user profiles as implemented in accordance with an embodiment of the disclosure.

FIG. 6 is a generalized flowchart of managing the invocation of a plurality of user profiles as implemented in accordance with an embodiment of the disclosure. In this embodiment, user profile invocation management operations are begun in block 602, followed by the monitoring of user profile invocation in block 604. A determination is made in block 606 whether a user profile is to be manually or automatically invoked. If manual, then a user profile is selected in block 608 and then manually invoked in block 610, replacing any currently invoked user profile.

However, if it is determined in block 606 that a user profile is to be automatically invoked, then a determination is made in block 612 whether a trigger date, as described in greater detail herein, has occurred. If so, then the user profile associated with the trigger date is automatically invoked in block 614, replacing any currently invoked user profile. However, if it is determined in block 612 that a trigger date has not occurred, then a determination is made in block 616 whether a trigger event, as described in greater detail herein, has occurred. If so, then the user profile associated with the trigger event is automatically invoked in block 618, replacing any currently invoked user profile. Once the user profile has been manually invoked in block 610, or automatically invoked in block 614 by a trigger date or in block 618 by a trigger event, a determination is made in block 620 whether to continue user profile invocation management operations. If so, then the process continues, proceeding with block 604. Otherwise, user profile invocation management operations are ended in block 622.

Figure 7A:
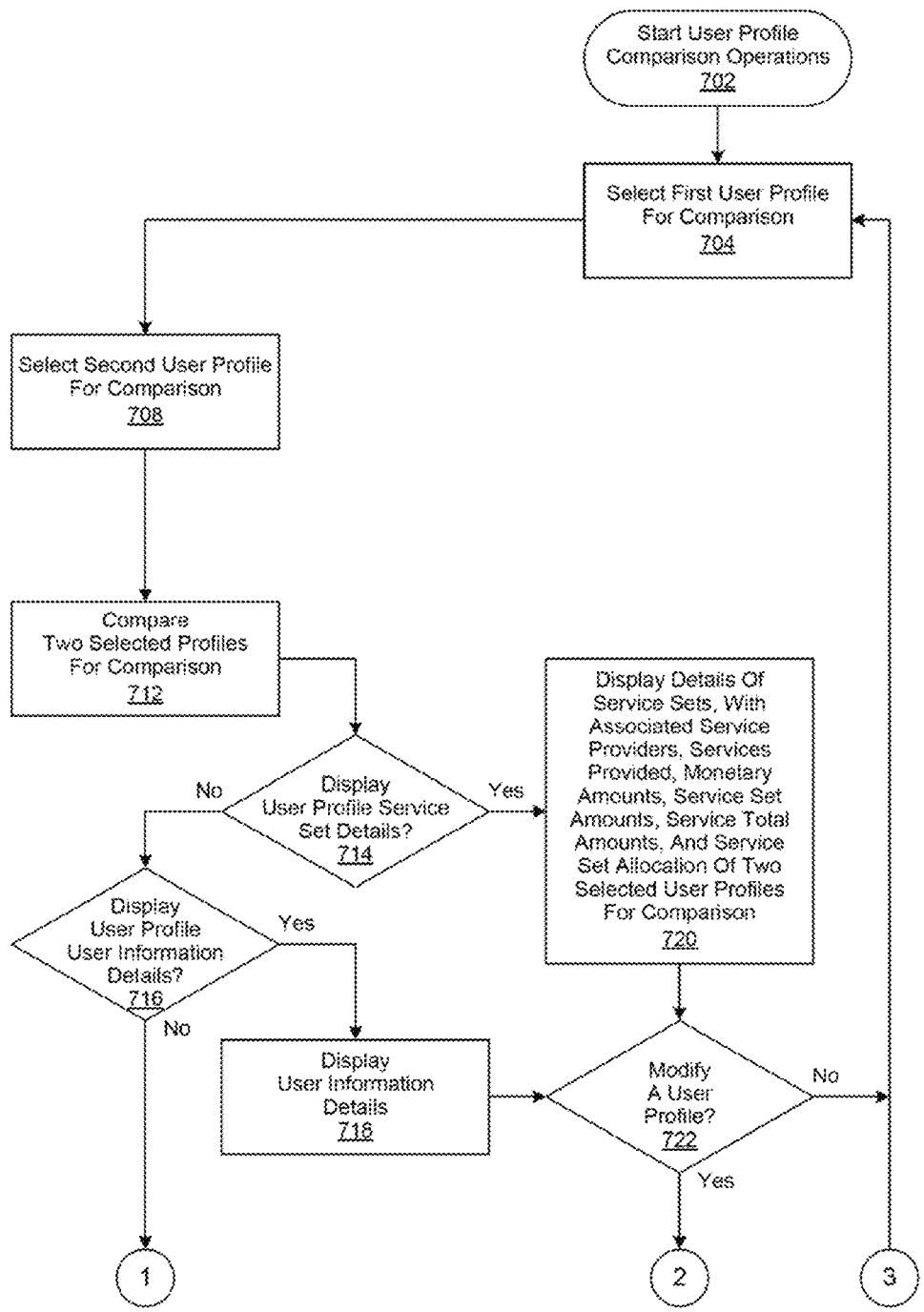
FIGS. 7a-b are a generalized flowchart of comparing user profiles as implemented in accordance with an embodiment of the disclosure.
Figure 7B:
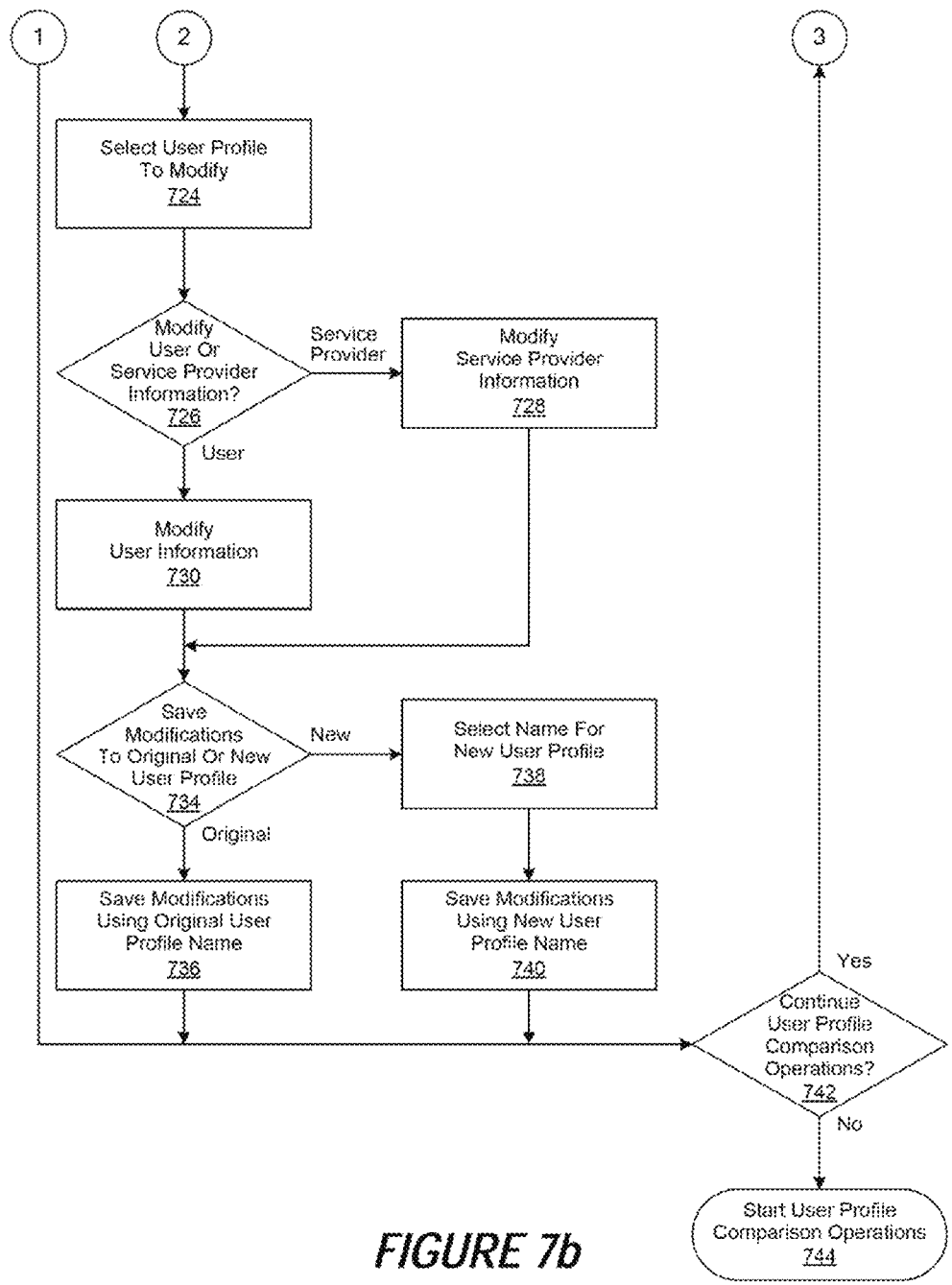

FIGS. 7a-b are a generalized flowchart of comparing user profiles as implemented in accordance with an embodiment of the disclosure. In this embodiment, user profile comparison operations are begun in block 702, followed by the selection in block 704 of a user profile associated with the user for comparison to a second user profile associated with the user. The second user profile to be used for comparison is then selected in block 708. Once the comparison user profile has been selected in block 708, it is compared in block 712 to the selected user profile within a user interface.

A determination is then made in block 714 whether to display the user profile service set details. In one embodiment, the user profile comprises a plurality of service sets, each of which comprises at least one service provided by an associated service provider, with each service further having an associated monetary amount. The service set further comprises a service set amount, which is the sum of the monetary amounts associated with the services of the service set. The user profile further comprises a service total amount, which is the sum of its associated service set amounts. In one embodiment, each service set comprises a service set allocation, wherein the service set allocation is calculated by dividing each of the service set amounts of each profile by the service total amount corresponding to the user profile.

If it is determined in block 714 to display the user profile service set details, then the details of the service sets, with associated service providers, services provided, monetary amounts, service set amounts, service total amounts, and service set allocation of the two user profiles are displayed in block 720 for comparison within the user interface. In one embodiment, the service set details are displayed numerically within the user interface. In another embodiment, the service set details are displayed as graphical elements within a graphical user interface (GUI). In yet another embodiment, service set allocations are operable to be modified in response to a user gesture interacting with the plurality of graphical elements. However, if it is determined within block 714 not to display the user profile service set details, then a determination is made in block 716 whether to display user profile user information details. If not, then, a determination is then made in block 742 whether to continue user profile recommendation operations. If so, then the process continues, proceeding with block 704. Otherwise, user profile configuration operations are ended in block 744. However, if it is determined in block 716 to display user profile user information details, then they are displayed within the user interface in block 718. Thereafter, or if the user profile service set details are displayed in block 720, a determination is made in block 722 whether to modify the selected user profile. If not, the process continues, proceeding with block 704.

However, if it is determined in block 722 to modify the selected user profile, then the user profile to be modified is selected in block 724. A determination is then made in block 726 whether to modify user information or service provider information of the user profile. If it is determined in block 726 to modify service provider information, then it is modified in block 728 as described in greater detail herein. However, if it is determined in block 726 to modify user information, then it is modified in block 730 as described in greater detail herein. Once the selected user profile is modified in block 728 or 730, a determination is made in block 734 whether to save the modified user profile under its original name or as a new user profile with a new name. If new, then a new name for the new user profile is selected in block 738 and the new user profile is saved under the new name in block 740. If original, then the modifications to the user profile are saved under the original name in block 736. A determination is then made in block 742 whether to continue user profile recommendation operations. If so, then the process continues, proceeding with block 704. Otherwise, user profile configuration operations are ended in block 744.

Figure 8:
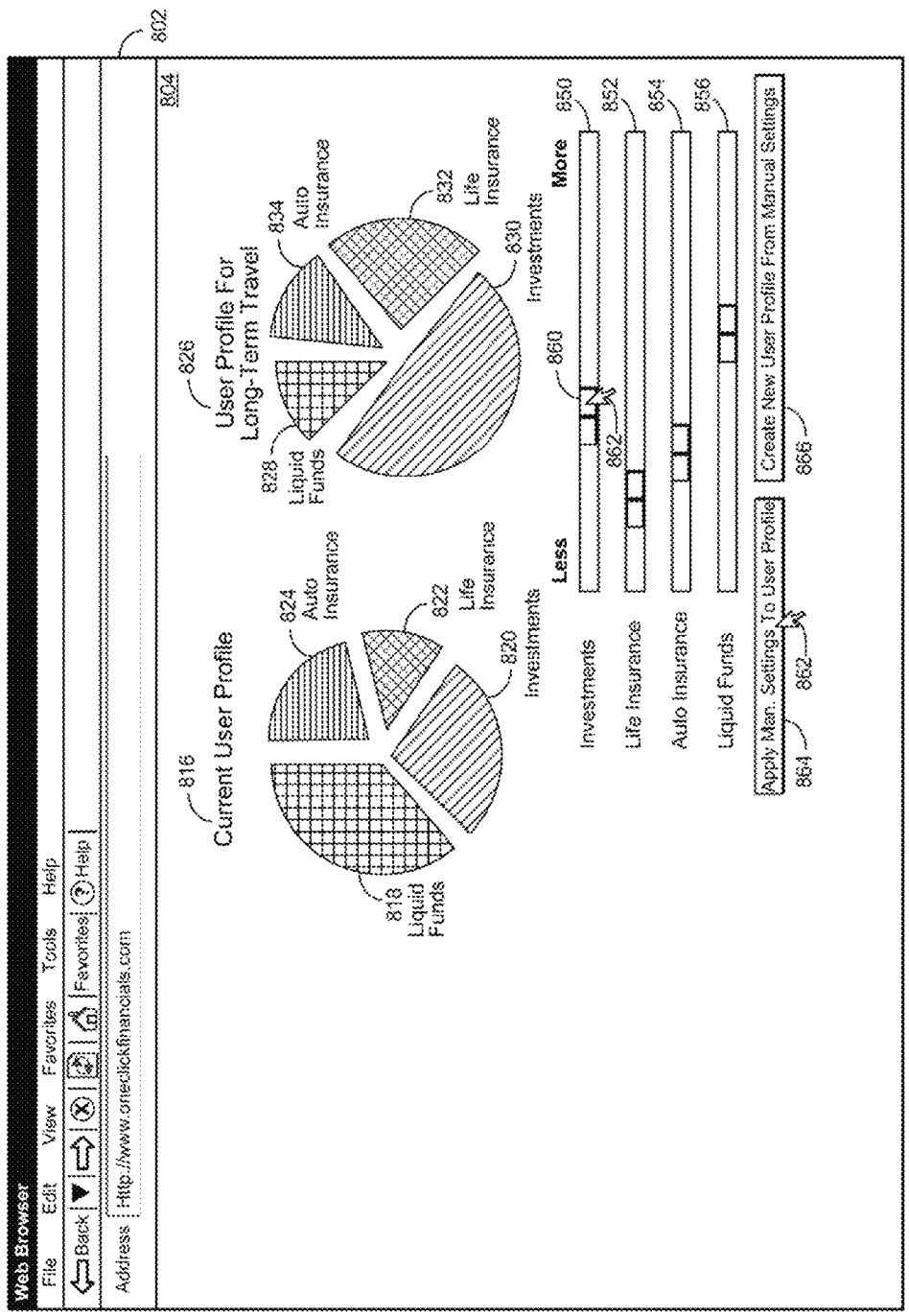
FIG. 8 is a simplified illustration of comparing user profiles as implemented within a user interface window in accordance with an embodiment of the disclosure.

FIG. 8 is a simplified illustration of comparing user profiles as implemented within a user interface window in accordance with an embodiment of the disclosure. In this embodiment, a first user profile 816 associated with the user is selected and displayed within the user interface 804 of browser 802 for comparison to a second user profile 826 associated with the user. The first user profile 816 shows the user's current monetary allocation to liquid funds 818, investments 820, life insurance 822, and auto insurance 824. The second user profile 826 is then selected from a plurality of user profiles associated with the user. As an example, the second user profile may be a user profile that is invoked when the user is on long-term travel. As shown in FIG. 8, the second user profile 826 likewise shows monetary allocations to liquid funds 828, investments 830, life insurance 832, and auto insurance 834. The first user profile 816 and the second user profile 826 are then likewise displayed within the user interface 804 of browser 802.

In one embodiment, each of the user profiles 816 and 826 comprise a plurality of service sets, each of which comprises at least one service provided by an associated service provider. In turn, each service further has an associated monetary amount. The service set further comprises a service set amount, which is the sum of the monetary amounts associated with the services of the service set. The user profile further comprises a service total amount, which is the sum of its associated service set amounts. In one embodiment, each service set comprises a service set allocation (e.g., 818, 820, 822, and 824 for first user profile 816), wherein the service set allocation is calculated by dividing each of the service set amounts of each profile by the service total amount corresponding to the user profile.

In one embodiment, the service set allocations (e.g., 818, 820, 822, and 824 for first user profile 816), are displayed as graphical elements within the graphical user interface (GUI) 804. In yet another embodiment, service set allocations are operable to be modified in response to a user gesture interacting with the plurality of graphical elements. As an example, adjusting slider bar 860 of the investment graphical element 850 for investments with a user gesture, such as with mouse cursor 862, alters the monetary allocation for investments 830 of the second user profile 826. Likewise adjusting the slider bars of the life insurance 852, auto insurance 854, and liquid funds 856 graphical element would have a corresponding effect on the monetary allocations for life insurance 832, auto insurance 834, and liquid funds 828 of the selected user profile 826. In one embodiment, the manually adjusted monetary allocations are applied to the selected user profile 826 by selecting the "Apply Manual Settings To User Profile" command button 864 through a user gesture, such as a mouse click with mouse cursor 862. In another embodiment, a new user profile is created from the manually adjusted monetary allocations by selecting the "Create New User Profile From Manual Settings" command button 866.

Figure 9A:
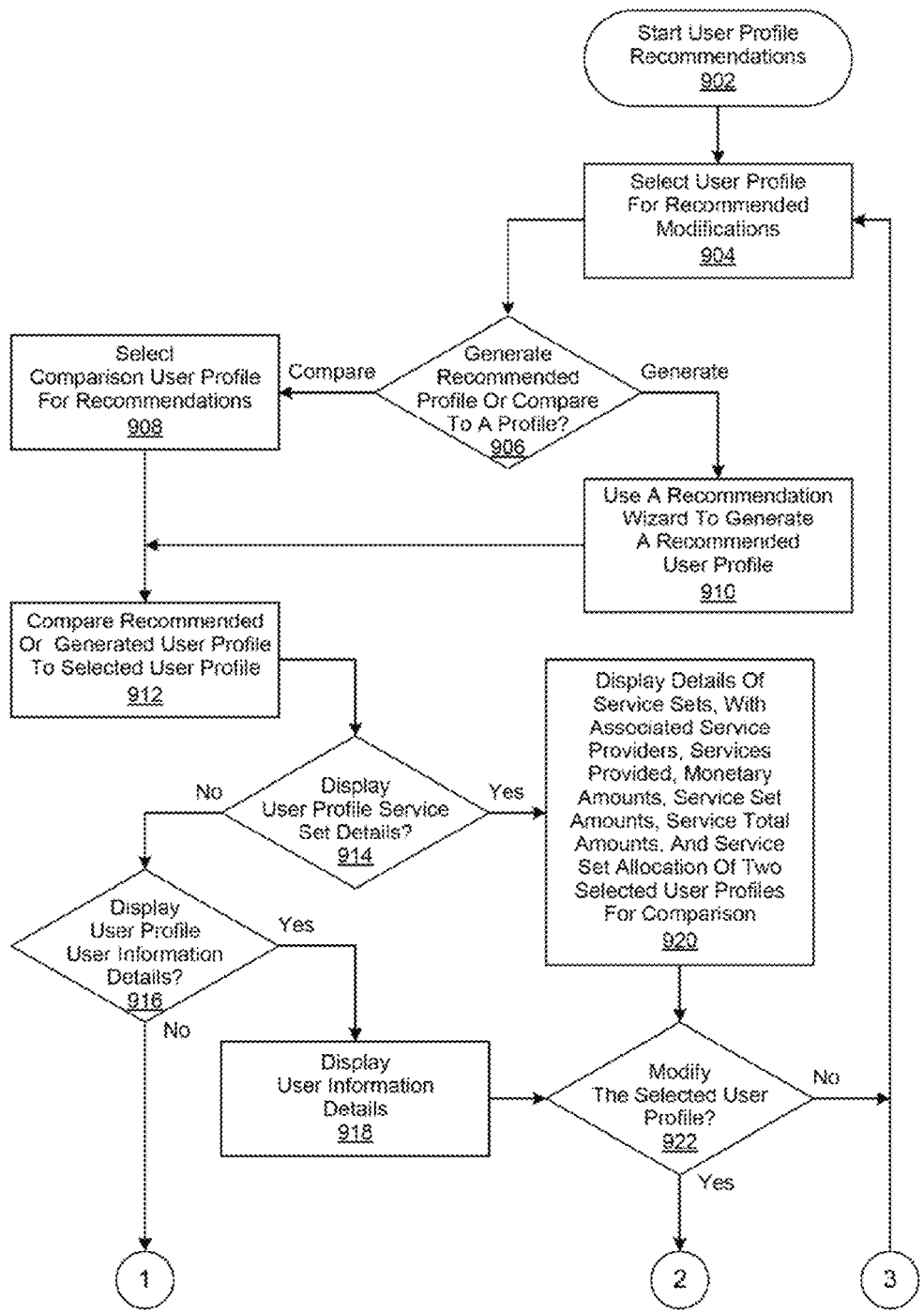
FIGS. 9a-b are a generalized flowchart of recommending modifications to a user profile as implemented in accordance with an embodiment of the disclosure.
Figure 9B:
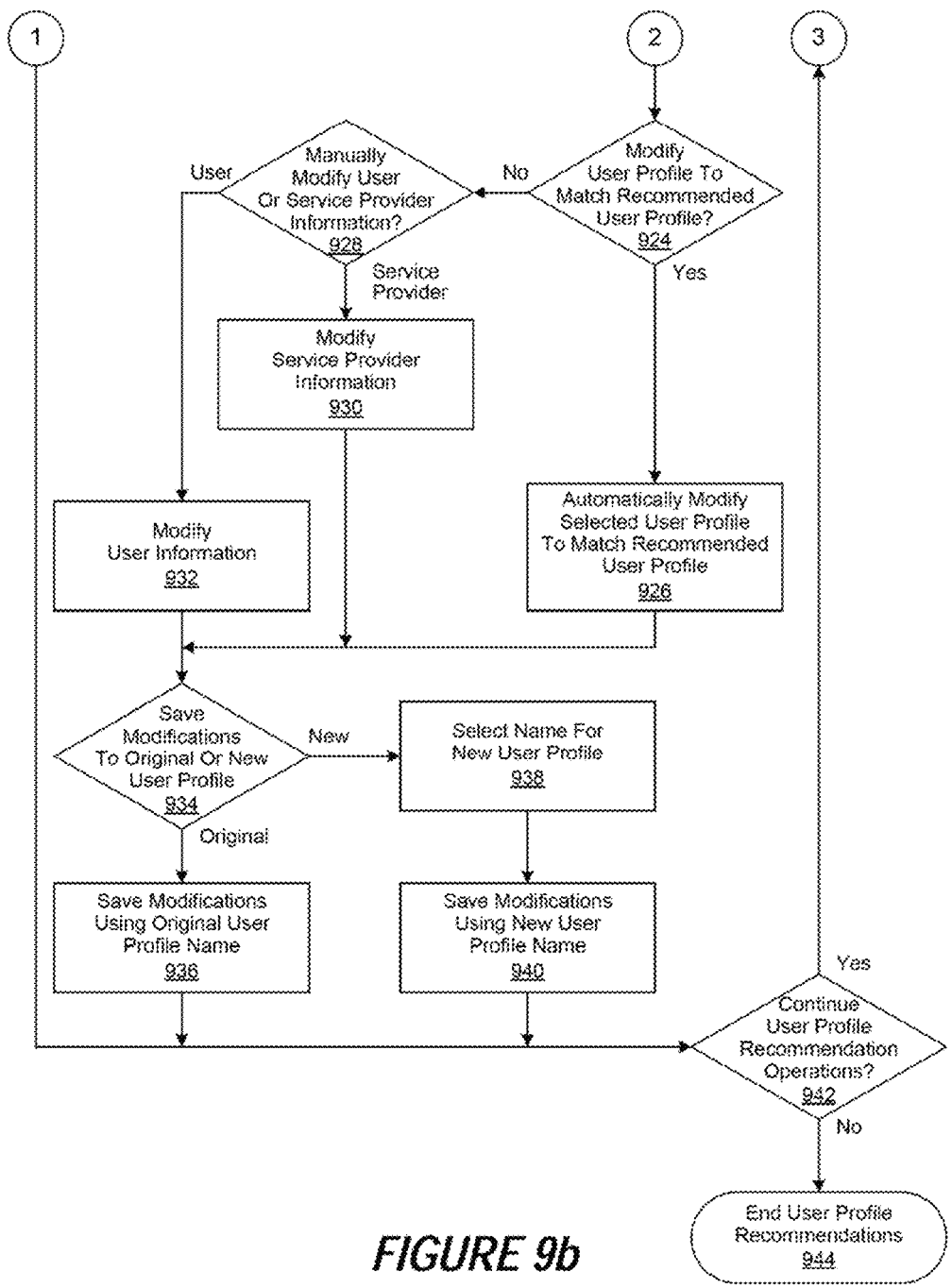

FIGS. 9*a-b* are a generalized flowchart of recommending modifications to a user profile as implemented in accordance with an embodiment of the disclosure. In this embodiment, user profile recommendations are begun in block 902, followed by the selection of a user profile associated with the user for recommended modifications in block 904. A determination is then made in block 906 whether to generate a recommended user profile or to select a recommended user profile for comparison. If it is determined in block 906 to generate a recommended user profile, then a recommendation wizard is used in block 910 to generate a recommended user profile from the user information and service provider information. It will be appreciated by those of skill in the art that a recommended user profile generated from user information indicating the user is going to be on extended foreign travel will be different from a user profile generated from user information indicating the user will be on a short-term domestic vacation. However, if it is determined in block 906 that a comparison user profile will be selected for recommendations, then a comparison user profile is selected in block 908. In one embodiment, the comparison user profile is selected from a plurality of user profiles associated with a plurality of other users. As an example, the comparison user profile may be an average of the user profiles of other users with similar characteristics as the user. Once the comparison user profile has been selected in block 908, or a recommended user profile has been generated in block 910, the generated or comparison user profile is compared in block 912 to the selected user profile within a user interface.

A determination is then made in block 914 whether to display the user profile service set details. In one embodiment, the user profile comprises a plurality of service sets, each of which comprises at least one service provided by an associated service provider, with each service further having an associated monetary amount. The service set further comprises a service set amount, which is the sum of the monetary amounts associated with the services of the service set. The user profile further comprises a service total amount, which is the sum of its associated service set amounts. In one embodiment, each service set comprises a service set allocation, wherein the service set allocation is calculated by dividing each of the service set amounts of each profile by the service total amount corresponding to the user profile.

If it is determined in block 914 to display the user profile service set details, then the details of the service sets, with associated service providers, services provided, monetary amounts, service set amounts, service total amounts, and service set allocation of the two user profiles are displayed in block 920 for comparison within the user interface. In one embodiment, the service set details are displayed numerically within the user interface. In another embodiment, the service set details are displayed as graphical elements within a graphical user interface (GUI). In yet another embodiment, service set allocations are operable to be modified in response to a user gesture interacting with the plurality of graphical elements. However, if it is determined in block 914 not to display the user profile service set details, then a determination is made in block 916 whether to display user profile user information details. If not, then a determination is then made in block 942 whether to continue user profile recommendation operations. If so, then the process continues, proceeding with block 904. Otherwise, user profile configuration operations are ended in block 944. However, if it is determined in block 916 to display user profile user information details, then they are displayed within the user interface in block 918. Thereafter, or if the user profile service set details are displayed in block 920, a determination is made in block 922 whether to modify the selected user profile. If not, the process continues, proceeding with block 904.

However, if it is determined in block 922 to modify the selected user profile, then a determination is made in block 924 whether to modify the selected user profile to match the recommended user profile. In one embodiment, the recommended user profile is selected from a plurality of user profiles associated with a plurality of other users as described in greater detail herein. If a determination is made in block 924 to match the selected user profile to the recommended user profile, then the selected user profile is automatically modified to match the recommended user profile in block 926. However, if it is determined in block 924 not to match the recommended user profile, then a determination is made in block 928 whether to manually modify user information or service provider information of the user profile. If it is determined in block 928 to modify service provider information, then it is modified in block 930 as described in greater detail herein. Alternatively, if it is determined in block 928 to modify user information, then it is modified in block 932 as described in greater detail herein. Once the selected user profile is automatically modified in block 926, or manually in block 930 or 932, a determination is made in block 934 whether to save the modified user profile under its original name or as a new user profile with a new name. If new, then a new name for the new user profile is selected in block 938 and the new user profile is saved under the new name in block 940. If original, then the modifications to the user profile are saved under the original name in block 936. A determination is then made in block 942 whether to continue user profile recommendation operations. If so, then the process continues, proceeding with block 904. Otherwise, user profile configuration operations are ended in block 944.

Figure 10:
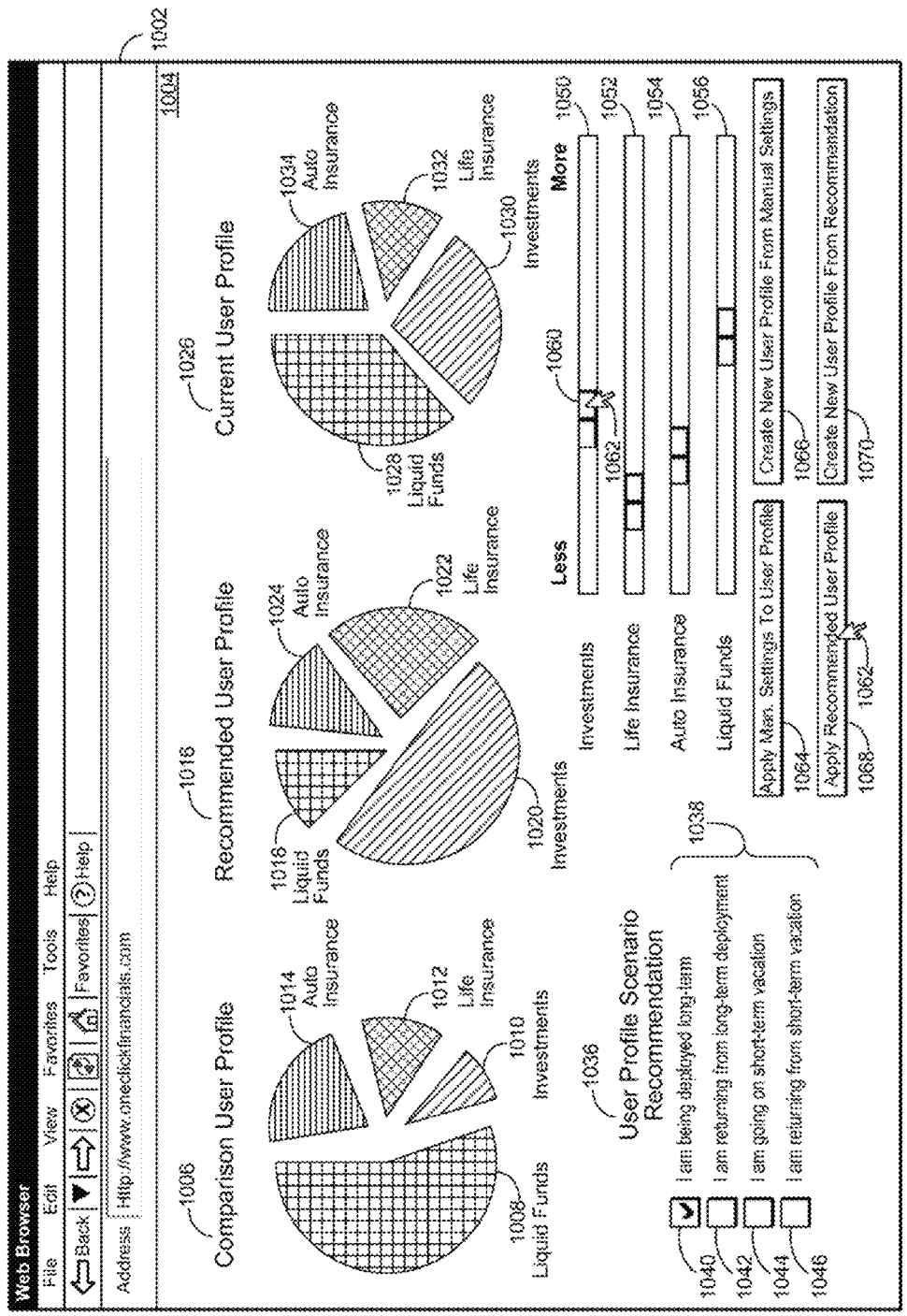
FIG. 10 is a simplified illustration of recommending modifications to a user profile as implemented within a user interface window in accordance with an embodiment of the disclosure.

FIG. 10 is a simplified illustration of recommending modifications to a user profile as implemented within a user interface window in accordance with an embodiment of the disclosure. In this embodiment, a current user profile 1026 associated with the user is selected and displayed within the user interface 1004 of browser 1002 for recommended modifications. The current user profile 1026 shows the user's current monetary allocation to liquid funds 1028, investments 1030, life insurance 1032, and auto insurance 1034. In one embodiment, user information and service provider information is processed to generate a recommended user profile 1016. As an example, the user may make a selection from possible profile scenarios 1038 of the User Profile Scenario Recommendation 1036 to generate the recommended user profile 1016. It will be appreciated by those of skill in the art that the selection of "I am being deployed long-term" profile scenario 1040 will lead to generation of a different recommended user profile 1016 from that generated by selecting profile scenarios 1042, 1044, or 1046. As shown in FIG. 10, the recommended user profile 1016 shows a recommended monetary allocation to liquid funds 1018, investments 1020, life insurance 1022, and auto insurance 1024. A comparison user profile 1006 is selected from a plurality of user profiles associated with a plurality of other users. As an example, the comparison user profile 1006 may be an average of the user profiles of other users with characteristics similar to those of the user. The comparison user profile 1006 likewise shows an average monetary allocation to liquid funds 1008, investments 1010, life insurance 1012, and auto insurance 1014. The recommended user profile 1016 and the comparison user profile 1006 are then likewise displayed within the user interface 1004 of browser 1002.

In one embodiment, each of the user profiles 1006, 1016, and 1026 comprise a plurality of service sets, each of which comprises at least one service provided by an associated service provider. In turn, each service further has an associated monetary amount. The service set further comprises a service set amount, which is the sum of the monetary amounts associated with the services of the service set. The user profile further comprises a service total amount, which is the sum of its associated service set amounts. In one embodiment, each service set comprises a service set allocation (e.g., 1008, 1010, 1012, and 1014 for comparison user profile 1006), wherein the service set allocation is calculated by dividing each of the service set amounts of each profile by the service total amount corresponding to the user profile.

In one embodiment, the service set allocations (e.g., 1008, 1010, 1012, and 1014 for comparison user profile 1006), are displayed as graphical elements within the graphical user interface (GUI) 1004. In yet another embodiment, service set allocations are operable to be modified in response to a user gesture interacting with the plurality of graphical elements. As an example, adjusting slider bar 1060 of the investment graphical element 1050 for investments with a user gesture, such as with mouse cursor 1062, alters the monetary allocation for investments 1030 of the selected user profile 1026. Likewise adjusting the slider bars of the life insurance 1052, auto insurance 1054, and liquid funds 1056 graphical element would have a corresponding effect on the monetary allocations for life insurance 1032, auto insurance 1034, and liquid funds 1028 of the selected user profile 1026. In one embodiment, the manually adjusted monetary allocations are applied to the selected user profile 1026 by selecting the "Apply Manual Settings To User Profile" command button 1064 through a user gesture, such as a mouse click with mouse cursor 1062. In another embodiment, a new user profile is created from the manually adjusted monetary allocations by selecting the "Create New User Profile From Manual Settings" command button 1066. In yet another embodiment, selected user profile 1026 is automatically modified to match the recommended user profile 1016 by selecting the "Apply Recommended User Profile" command button 1068, likewise through a user gesture such as a mouse click with mouse cursor 1062. In still another embodiment, a new user profile is created from the automatically adjusted monetary allocations by selecting the "Create New User Profile From Recommendation."

The flowchart and block diagrams in the figures illustrate the architecture, functionality, and operation of possible implementations of systems, methods and computer program products according to various embodiments of the disclosure. Accordingly, each block in the flowchart or block diagrams may represent a module, segment, or portion of code, which comprises one or more executable instructions for implementing the specified logical function(s). In certain alternative implementations, the functions performed in a particular block may occur in an order that is different from what is noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "embodiment" can be used to describe any aspect, feature, process or step, any combination thereof, and/or any portion thereof, of the disclosure and should not be interpreted as limiting the scope of the application or claims.

While the disclosure has been described by reference to particular embodiments, such references do not imply a limitation and no such limitation is to be inferred. As such, the disclosure includes any and all embodiments having equivalent elements, modifications, omissions, combinations (e.g., of aspects across various embodiments), adaptations, alterations, and equivalents in form and function. As will be further appreciated by those skilled in the pertinent arts, the disclosure has a number of aspects and embodiments, and various embodiments may include overlapping features.

For example, the above-discussed embodiments may include software modules that include script, batch, or other executable files for the performance of certain tasks. These software modules may be stored on a machine-readable or computer-readable storage medium such as a disk drive. Storage devices used for storing software modules in accordance with various embodiments may include magnetic floppy disks, hard disks, or optical discs such as CD-ROMs or DVDs. A storage device used for storing firmware or hardware modules in accordance with an embodiment may also include a semiconductor-based memory, which may be permanently, removably or remotely coupled to a microprocessor/memory system. Thus, the software modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module. In addition, each of the referenced components in this embodiment may be comprised of a plurality of components, each interacting with the other in a distributed environment. Furthermore, other embodiments may expand on the referenced embodiment to extend the scale and reach of the system's implementation.

The description of the disclosure has been presented for purposes of illustration and description, but is not intended to be exhaustive or limited in the form disclosed. It will be apparent to those of skill in the art that many modifications and variations are possible without departing from the scope and spirit of the disclosure, giving full cognizance to equivalents in all respects.

What is claimed is:

1. A system for managing services provided on behalf of a user, comprising:
a storage medium, comprising:
a registry storing one or more user profiles; and
a repository storing:
user information that identifies the user, service preferences of the user, attributes of the user, or any combination thereof; and
service provider information that identifies a service provider, attributes of the service provider, association information between the user and the service provider, or any combination thereof; and
one or more processors configured to provide:
a user profile generator operable to receive input from a user to:
display a first user profile associated with the user via a user interface, wherein the first user profile comprises a first subset of the user information associated with the user that is cross-referenced with a first subset of the service provider information that is associated with a service provider account of the user;
modify the first subset of the user information, the first subset of the service provider information, or both, creating a second subset of the user information, a second subset of the service provider information, or both; and
save the modifications to the first subset of the user information, the first subset of the service provider information, or both as a second user profile, without modifying the first user profile, such that the first user profile remains saved without modifications; and
a service fulfillment system, comprising the one or more processors configured to:
receive a second user profile invocation input that indicates when the second user profile should be invoked;
when the second user profile should be invoked, invoke a second provision of services defined by the modifications to the first subset of the user information, the first subset of the service provider information, or both of the second user profile; wherein the second provision of services are invoked in place of a first provision of services related to the first user profile; and
when the second user profile should no longer be invoked, re-invoke the first provision of services related to the first user profile.

2. The system of claim 1, wherein the service fulfillment system is configured to receive subsequent input to invoke a provision of services related to the first user profile on behalf of the user after the second user profile has already been invoked.

3. The system of claim 2, wherein, upon receipt of the subsequent input, the service fulfillment system is configured to invoke a provision of services related to a different user profile than the first user profile and the second user profile.

4. The system of claim 1, wherein:
the first subset of user information, the first subset of service provider information, or both comprises a first set of user contact information; and
the second subset of user information, the second subset of service provider information, or both comprises a second set of user contact information.

5. The system of claim 1, wherein the first subset of user information, the first subset of service provider information, or both comprises a plurality of user parameters and a plurality of service provider parameters.

6. The system of claim 5, wherein the plurality of service provider parameters comprises a start date and a stop date for the provision of a service by a service provider.

7. The system of claim 6, wherein the plurality of service provider parameters further comprises a payment amount for the provision of a service by the service provider.

8. A tangible, non-transitory, computer-readable storage medium comprising machine-readable instructions that, upon execution, are configured to:
display, via a user interface, a first user profile associated with the user comprising user information associated with the user, wherein the user information includes service preferences associated with a plurality of third party accounts of the user, and third party service provider information, wherein the third party service provider information is associated with the third party accounts of the user;
modify the service preferences of the user information, to create a second set of service preferences associated with the plurality of third party accounts of the user;
generate a second user profile, by saving the modifications to the service preferences of the user information, without saving over the first user profile;
receive a second user profile invocation input that indicates when the second user profile should be invoked;
when the second user profile should be invoked, invoke the second user profile, providing a provision of services based on the second set of service preferences, by:
using the second user profile to issue instructions to the plurality of third party service providers to provide services on behalf of the user, wherein the instructions are executed to change the provision of services from the service preferences related to the first user profile to the second set of service preferences in response to receipt of the second user profile invocation input to invoke the second user profile; and
providing service execution information to the plurality of third party service providers; and
when the second user profile should not be invoked, invoke the first provision of services related to the first user profile.

9. The computer-readable storage medium of claim 8, wherein the the first user profile and the second user profile comprise a list of action items, wherein each action item corresponds to a service preference to be provided on behalf of the user by a third party service provider.

10. The computer-readable storage medium of claim 8, including instructions executed to enable the execution of a transaction with the plurality of third party service providers by a third party on behalf of the user, wherein the enabling provides predetermined user information and service provider information to the third party.

11. The computer-readable storage medium of claim 10, wherein the predetermined user information comprises predetermined financial account information provided to the third party for the execution of a transaction.

12. The computer-readable storage medium of claim 11, wherein:
the transaction is a payment transaction;
the predetermined financial account information is provided to the third party for execution of the payment transaction; and
the third party is a financial institution.

13. The computer-readable storage medium of claim 11, wherein:

the transaction is a funds transfer transaction;
the predetermined financial account information is provided to the third party for execution of the funds transfer transaction; and
the third party is a financial institution.

14. The computer-readable storage medium of claim 11, wherein:
the transaction is an investment account transaction;
the predetermined financial account information is provided to the third party for execution of the investment account transaction; and
the third party is an investment broker.

15. A system for managing third party services provided on behalf of a user, comprising:
at least one tangible and non-transitory storage medium comprising:
a registry, storing one or more user profiles; and
a repository storing:
user information that identifies the user, service preferences of the user, attributes of the user, or any combination thereof; and
third party service provider information for a plurality of third party service providers;
one or more processors configured to:
display a first user profile comprising a first set of user information and third party service provider information associated with the user;
receive modifications to the first set of user information and third party service provider information to generate a second set of user information and third party service provider information, without saving the modifications to the first user profile, such that the first user profile remains saved without said modifications;
receive a request to save the second set of user information and third party service provider information as a second user profile;
concurrently display the first user profile and the second user profile associated with the user; and
receive a request to invoke the second user profile for a provision of services associated with the second user profile, wherein the provision of services related to the second user profile is activated in place of a provision of services related to the first user profile;
determine, based upon the request when the second user profile should be invoked;
generate, in response to receiving the request to invoke the second user profile, a plurality of third party service execution information, wherein the plurality of third party service execution information comprises instructions to invoke the provision of services based upon the second set of user information and third party service provider information, when the second user profile should be invoked;
transmit the plurality of third party service execution information to the plurality of third party service providers to invoke the provision of services according to the second user profile; and
when the second user profile should not be invoked, cause invocation of the provision of services related to the first user profile.

16. The system of claim 15, wherein the invoking of the second user profile is performed automatically in response to receiving the request.

17. The system of claim 15, wherein the first user profile reactivated in place of the second user profile after the second user profile is invoked.

18. The system of claim 17, wherein the second user profile is invoked in response to receiving the request and the first user profile is re-invoked on a predetermined date provided in the request.

19. The system of claim 17, wherein the second user profile is invoked automatically on a predetermined date provided in the request.

20. The system of claim 17, wherein the provision of services related to the first user profile is reactivated in place of the second user profile in response to receiving a request to invoke the first user profile after receiving the request to invoke the second user profile.

* * * * *